United States Patent
Macrae

(10) Patent No.: US 10,118,822 B2
(45) Date of Patent: Nov. 6, 2018

(54) HYDROGEN PRODUCTION SYSTEM AND METHODS OF USING SAME

(71) Applicant: CLEAN WAVE ENERGY CORP, Orangeville (CA)

(72) Inventor: Gavin Macrae, Orangeville (CA)

(73) Assignee: CLEAN WAVE ENERGY CORP, Orangeville, ON (CA)

( * ) Notice: Subject to any disclaimer, the term of this patent is extended or adjusted under 35 U.S.C. 154(b) by 0 days.

(21) Appl. No.: 14/763,090

(22) PCT Filed: Jan. 24, 2014

(86) PCT No.: PCT/CA2014/000056
§ 371 (c)(1),
(2) Date: Jul. 23, 2015

(87) PCT Pub. No.: WO2014/113880
PCT Pub. Date: Jul. 31, 2014

(65) Prior Publication Data
US 2015/0360941 A1    Dec. 17, 2015

Related U.S. Application Data

(60) Provisional application No. 61/756,373, filed on Jan. 24, 2013.

(51) Int. Cl.
*C01B 3/08* (2006.01)
*F02M 21/02* (2006.01)
(Continued)

(52) U.S. Cl.
CPC .............. *C01B 3/08* (2013.01); *B01J 19/24* (2013.01); *C01F 7/428* (2013.01); *F01K 3/188* (2013.01);
(Continued)

(58) Field of Classification Search
CPC .............. C01B 3/08; C01F 7/428; B01J 19/24
(Continued)

(56) References Cited

U.S. PATENT DOCUMENTS 5,143,047 A      9/1992   Lee
2003/0118505 A1  6/2003   Anderson et al.
(Continued)

FOREIGN PATENT DOCUMENTS

JP   2010047442 A   3/2010
WO   2010034748 A1  4/2010
(Continued)

OTHER PUBLICATIONS

International Preliminary Examination Report on Patentability PCT/CA2014/000056 dated Jul. 28, 2015.
(Continued)

*Primary Examiner* — Douglas B Call
(74) *Attorney, Agent, or Firm* — Roberts Mlotkowski Safran Cole & Calderon, P.C.

(57) ABSTRACT

The present invention is directed to hydrogen production systems and methods of using same. The systems support a hydrogen production reaction that comprises aluminum and a catalyst or wool and van produce hydrogen on-demand. The hydrogen and the heat produced by the systems can be used for many applications, including to power vehicles, heat homes, or power electricity-producing power plants.

15 Claims, 18 Drawing Sheets

(51) Int. Cl.
*F01K 3/18* (2006.01)
*F01K 7/16* (2006.01)
*C01F 7/42* (2006.01)
*B01J 19/24* (2006.01)
*F02M 25/12* (2006.01)

(52) U.S. Cl.
CPC .............. *F01K 7/16* (2013.01); *F02M 21/02* (2013.01); *F02M 25/12* (2013.01); *B01J 2219/00051* (2013.01); *B01J 2219/24* (2013.01); *Y02E 60/36* (2013.01); *Y02T 10/121* (2013.01)

(58) Field of Classification Search
USPC ...................................................... 423/658.2
See application file for complete search history.

(56) References Cited

U.S. PATENT DOCUMENTS

| 2006/0034756 | A1 | 2/2006 | Watanabe |
| 2007/0237994 | A1 | 10/2007 | Nakai et al. |
| 2009/0252671 | A1* | 10/2009 | Fullerton ............... B01J 7/02 423/657 |
| 2012/0186543 | A1 | 7/2012 | Lohr, Sr. |
| 2012/0009119 | A1 | 12/2012 | Yampolsky |
| 2014/0154173 | A1* | 6/2014 | Phillips ............... H01M 8/065 423/657 |

FOREIGN PATENT DOCUMENTS

| WO | 2010076802 | | 7/2010 |
| WO | 2011040942 | | 4/2011 |
| WO | 2011040942 | A1 | 4/2011 |
| WO | WO2013/016367 | * | 1/2013 |

OTHER PUBLICATIONS

Extended European Search Report issued in a corresponding EP application No. 14743159.7 dated Jul. 28, 2016.

* cited by examiner

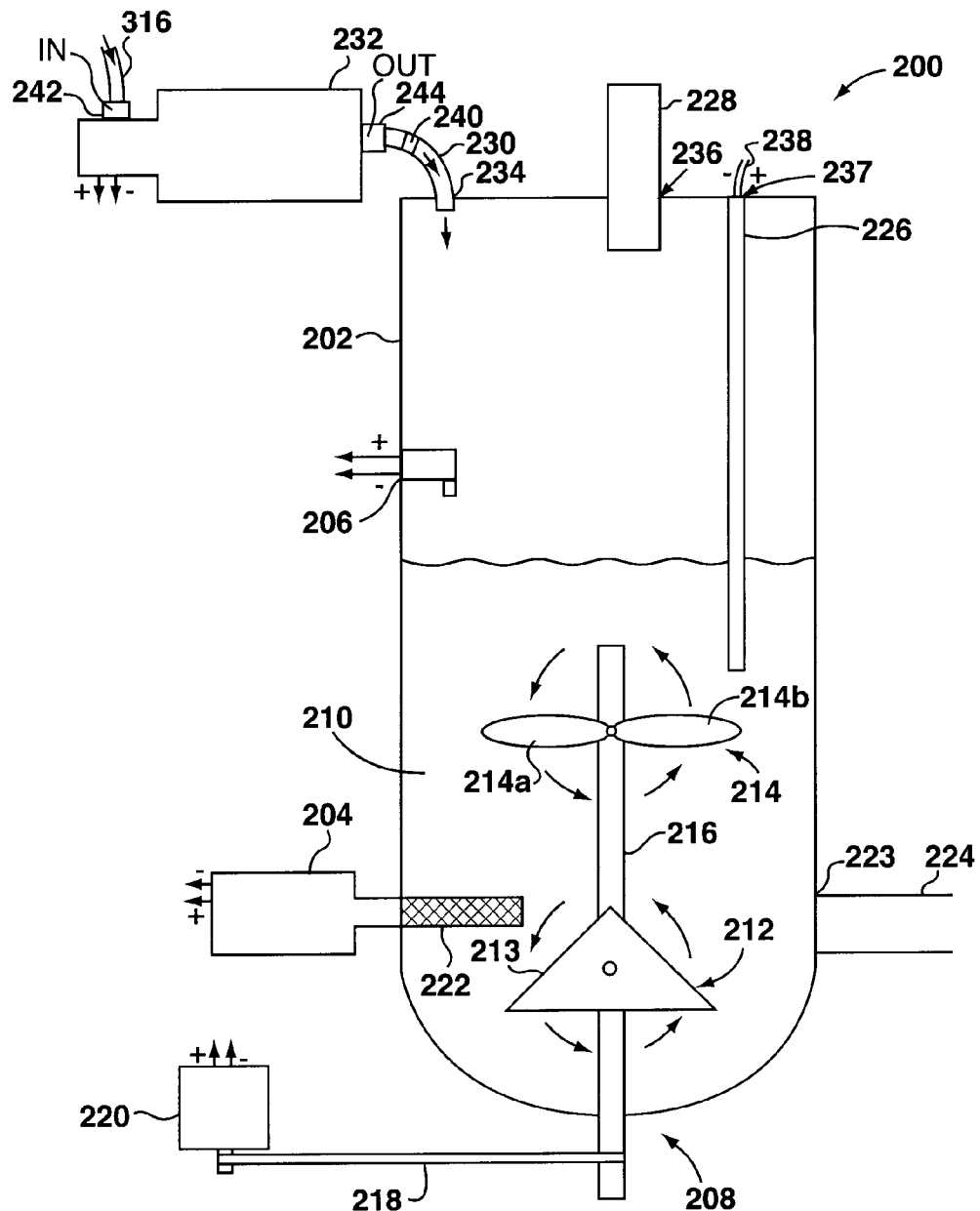
FIG. 2
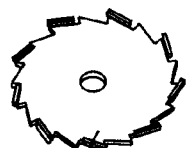
FIG. 2.1

HYDROGEN PRODUCTION SYSTEM AND METHODS OF USING SAME

PRIORITY DOCUMENT

The present application is a U.S. National Phase of PCT/CA2014/000056 filed on Jan. 24, 2014, claiming priority to U.S. Provisional Patent Application No. 61/756,373 filed Jan. 24, 2013. The disclosures of the PCT Application and U.S. Provisional Patent Application are hereby incorporated by reference into the present application.

BACKGROUND

The invention relates to hydrogen production systems, and more particularly to systems and methods for producing hydrogen on demand or storage and uses thereof.

The use of fossil fuels to operate vehicles and other devices has been highly recognized as having a negative impact on the environment. For example, the extensive use of vehicles, such as cars, trucks, and buses has resulted in a depletion of the earth's natural, non-renewable resources. In addition, the extremely high amount of exhaust gases, including $CO_2$, emitted during vehicle use is causing detrimental changes to the earth's environment.

The importance of exploring hydrogen as an alternate fuel source has been recognized over the past few decades. Hydrogen burns clean and has zero pollution index. It is hoped that one day hydrogen will decrease our dependence on fossil fuels.

Current methods of hydrogen production include natural gas reforming, electrolysis, gasification, nuclear high-temperature water splitting, and high temperature thermochemical water-splitting. All of these methods require very high temperatures and/or have high energy requirements.

SUMMARY

Generally speaking, the invention relates to systems that can produce hydrogen on demand and methods of using those systems including producing electricity. The invention also relates to vehicles and devices and more specifically the fuel and fueling systems for vehicles and any or all other internal combustion engines, plus other uses involving the burning of a fuel for purposes of creating heat, for any and all uses including the heating of water to create steam, which can be used to turn a turbine as part of the process in generating electricity incorporating the systems and methods of the present invention.

According to some embodiments of the present invention, a system to produce, prepare, and provide hydrogen ready to use for an application, such as by a vehicle, device, or process which operates on fuel, is provided. The system comprises a first reactor vessel which includes a tank operably connected to a stirring mechanism. The tank is capable of accommodating and stirring a slurry comprising an aqueous medium, a catalyst such as a highly active carbon catalyst or other material including wool, and a metal such as aluminum. The tank further comprises a heating mechanism, which can be used to provide heat to the slurry. The system can optionally further comprise one or more reactor vessels which can be securely connected to each other in series or in parallel, and which can be capable of accommodating and optionally stirring a portion of the slurry obtained from the first reactor vessel.

The system can optionally further comprise a cooling mechanism, which can be securely connected to one or all reaction vessels and can cool any hydrogen which is at elevated temperatures. The system can also optionally comprise a drying mechanism, which can be securely connected to one or all reaction vessels and/or the cooling mechanism and can remove moisture from the hydrogen. The system can also optionally comprise a collecting tank, which can be securely connected to one or all reaction vessels and/or the cooling mechanism and/or the drying mechanism. The collecting tank effectively stores the hydrogen produced within the reaction vessels for a short time or for longer periods so that it is ready to use by an application.

In other embodiments of the present invention, methods of using the systems of the invention to produce and provide, and optionally prepare for, use by an application are provided.

In still other embodiments of the present invention, vehicles and devices which incorporate the systems of the present invention or are designed for accommodation of systems of the present invention are also provided.

BRIEF DESCRIPTION OF THE FIGURES

The invention is illustrated in the figures of the accompanying drawings which are meant to be exemplary and not limiting, in which like reference numbers indicate like features.

FIG. 2 is a schematic diagram of a reactor vessel in accordance with some embodiments of the present invention.

DETAILED DESCRIPTION OF THE ILLUSTRATIVE EMBODIMENTS

For a more complete understanding of the present invention, reference is now made to the following description of various illustrative and non-limiting embodiments thereof, taken in conjunction with the accompanying drawings. Throughout this description, the expression "sealingly connects" refers to a connection that is substantially gas and liquid impermeable.

The present invention relates to systems useful for hydrogen production and uses thereof. Looking first at FIG. 1, hydrogen production system 100 is shown in accordance with an embodiment of the present invention. Generally, system 100 can comprise pre-mixing vessel 300 which is capable of containing a slurry of some or all of the starting materials required to produce hydrogen (described further below). System 100 can further comprise reactor vessel 200, which can receive slurry from pre-mixing vessel 300. A reaction can be initiated by adding heat or other initiator to the slurry in reactor vessel 200 to produce hydrogen, as described further below. As would be understood by the person skilled in the relevant arts, the hydrogen that is produced by the systems of the present invention is hydrogen gas, known by the chemical symbol $H_2$.

Also included in system 100 is reactor vessel 400, which can be connected to vessel 200. Vessel 400 can function to receive a portion of the hydrogen-producing slurry from vessel 200 and can provide a second vessel in which to produce hydrogen. It is not necessary to have more than one reaction vessel in order to produce hydrogen, nor is it necessary to have only two reaction vessels. Hydrogen production systems having three, four, or more reaction vessels are embodiments of the present invention. Generally, having multiple reaction vessels can provide additional surface area of the slurry from which hydrogen is emitted, which may be preferential, in certain circumstances, over having one larger volume reaction vessel.

Figure 1:
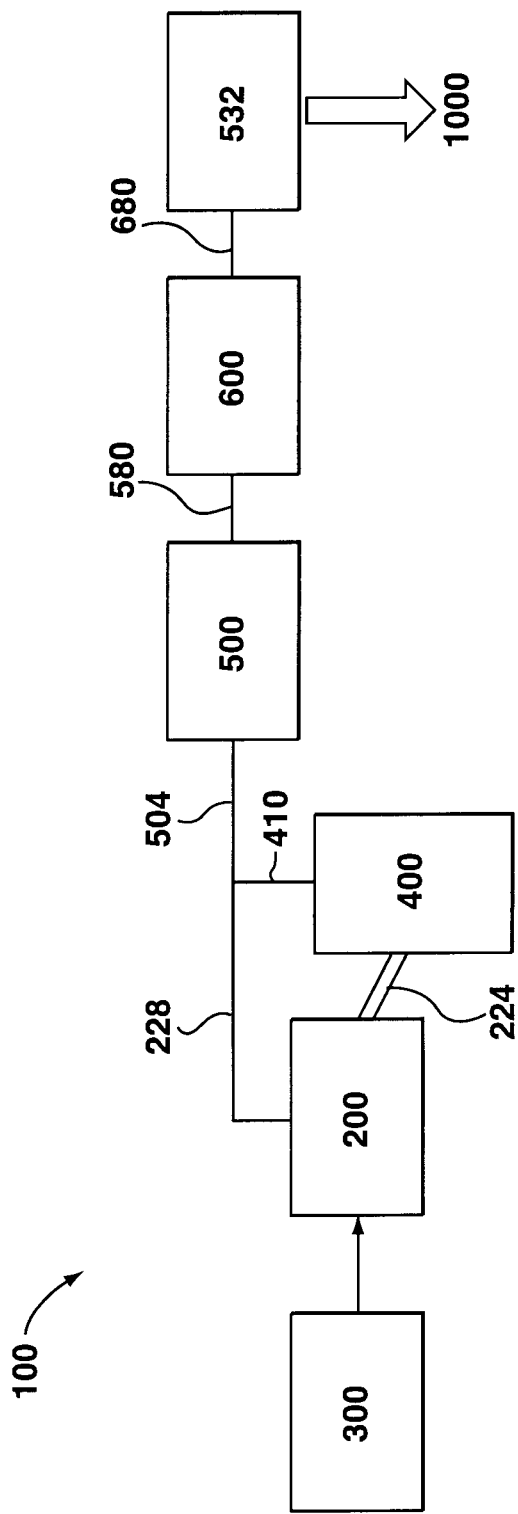
FIG. 1 is a schematic diagram of a hydrogen production system in accordance with some embodiments of the present invention.

Referring still to FIG. 1, reaction vessel 200 can be connected to outlet line 228, through which hydrogen can pass upon being produced within vessel 200 Similarly, reaction vessel 400 can be connected to outlet line 410, through which hydrogen can pass upon being produced within vessel 400. Both lines 228 and 410 connect at collector line 504 so that hydrogen produced by both vessels 200 and 400 can combine and continue through the system as one gas stream.

Many uses of hydrogen produced by the systems of the present invention require hydrogen on-demand and ready to use because of, for example, the issue of storage of usable amounts of hydrogen. In accordance with some embodiments of the present invention, system 100 can include cooler 500, which can receive hydrogen from line 504, as described further below. The hydrogen passing through line 504 can be at an elevated temperature as a result of the reaction occurring in reaction vessels 200 and 400, as described further below. Cooler 500 can receive the hot hydrogen and cools it to a usable temperature. The cooled hydrogen can then pass through 580 to dryer 600, where any remaining water is substantively or essentially completely removed from the hydrogen.

System 100 can also comprise collection tank 532 which can be connected to dryer 600 via 680 in order to receive dried hydrogen. Hydrogen can be collected into tank 532 as it is produced and provided on-demand to a user, vehicle, or device (including any and all internal combustion engines fuel cells, or other suitable devices) by a suitable connection. Any vehicle or device that is or can be adapted to use hydrogen as fuel is suitable to be used with the present invention. Examples of vehicles which can be adapted to use hydrogen as a fuel, at least in part, include cars, trucks, buses, boats and other marine vessels, motorcycles, train engines, and the like or fuel cells and the like. Other devices which may be adapted to use hydrogen as a fuel include engines or other devices used in the production of electricity, electricity generators, fuel cells, diesel engines, steam turbines and oil-fired furnaces for residential/commercial applications, primary heat source for radiators, power plants and for greater certainty, any and all internal combustion engines or other devices used to create heat.

Referring now to FIG. 2, reactor vessel 200 is shown in greater detail. Vessel 200 comprises holding tank 202 in which the hydrogen-producing reaction can occur. Tank 202 can be made of any suitably inert, impermeable, and sturdy material, such as but not limited to stainless steel, and can be able to withstand pressures of up to about 150-200 psi or greater and temperatures of between about 180-220 degrees Fahrenheit, or higher. It is preferable that the material that tank 202 is made of does not react with the starting materials or reaction products, including hydrogen. For example, it is preferable that it does not rust or decay or warp under temperature or pressure or over time. The size and shape of tank 202 can be determined by the skilled person and can be such that there is suitable surface area of reaction slurry 210 (described further below) from which a desired amount of hydrogen can be emitted. In the embodiment shown in FIG. 2, tank 202 is a cylindrical oval shape, although the skilled person would understand that other shapes can be operable in accordance with the present invention. Tank 202 can have, for example, a width of between about 2 inches to about 24 inches, or even wider, depending on the application of the hydrogen production system. To be used in a standard passenger vehicle (with or without additional vessels 300), tank 202 can have a width of between about 4 inches to about 22 inches, or between about 6 inches to about 14 inches, or can be about 7, 8, 9, 10, 11, 12, or 13 inches. For example, the width of tank 202 can be about 9 inches. The height of tank 202 can also be dependent on the application of the hydrogen production system. To be used in a standard passenger vehicle, the height of tank 202 can be between 6 inches to about 36 inches, or between about 12 inches to about 30 inches, or between about 20 inches to about 26 inches, or can be about 21, 22, 23, 24, or 25 inches. For example, the height of tank 202 can be about 24 inches. Dimensions can change and be adapted to scale the size of the hydrogen production system up or down depending on the use and the amount of hydrogen required.

Tank 202 can define opening 234 through which starting materials useful for hydrogen production can be introduced into tank 202. Starting materials can be combined into a slurry before they are introduced into tank 202 or added individually (to be described further below). In any case, once the starting materials are mixed, the starting materials form slurry 210 which can reside at the bottom portion of tank 202. Opening 234 is shown at the top of tank 202 of FIG. 2, but it will be recognized that opening 234 can be defined at various locations of tank 202 and can be situated above the anticipated surface area of slurry 210.

Slurry 210 can comprise an aqueous medium, an electron-donating metal, such as aluminum, and a catalyst, and any other standard material which may assist in the hydrogen-production reaction as described herein or as would be known to the skilled person (the components of slurry 210 may be referred to as starting materials in this application). The aqueous medium can be of any suitable form including water, tap water, distilled water, sea water, salt water, alkaline water, dirty water, and acidic water. The aluminum can be in various forms, such as aluminum powder, aluminum granules, aluminum shavings or as a solid aluminum bar, or mixtures of the foregoing. The aluminum can come from a recycling plant. Other metals that can be used instead of or in addition to aluminum can include, for example, platinum, magnesium, and iron, and materials such as sodium borohydride or sodium hydroxide may also be used in addition to or instead of the aluminum.

Hydrogen is produced from the water and aluminum in the presence of a catalyst generally according to the following equation:

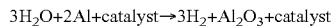

$$3H_2O + 2Al + \text{catalyst} \rightarrow 3H_2 + Al_2O_3 + \text{catalyst}$$

The catalyst can be an activated carbon catalyst. A preferred catalyst is Catalytic Carbon (this can be referred to as CC) available from Phillips Company at 10010 West Oak Ridge Drive, Sun City, Ariz. 85351 or PO Box 52, 311 NW Chickasaw Street, Millerton, Okla. 74750 or http://phillipscompany.4t.com. This catalyst is reusable and renewable/rechargeable. Other catalysts can be used as part of the invention, and a person skilled in the relevant arts can determine which catalyst would be suitable. Generally, the catalyst can support low and high flow rates of hydrogen, such as from about 1 liters per minute (LPM) to about 1500 LPM, and even higher. The catalyst can be able to produce suitable amounts of hydrogen even when it comprises about 2% or less by weight of the total starting materials (e.g., 2% catalyst, 49% aqueous medium, 49% aluminum). Ideally, to be accessible to a wide range of users for a wide range of applications, the catalyst can be safe to work with and have little or no negative impact on the environment. It can have a high cycle rate (uses) so that it does not need to be replaced often. The catalyst can be easily retrievable, retain pH neutral slurry before and after the hydrogen-production reaction, be non-toxic and safely disposable if the need should arise, and be simple to produce and abundant. The skilled person could determine which catalysts would be useful and safe for use with the present invention The reaction can begin once the slurry is brought to a temperature of about 150 degrees Fahrenheit, and can continue at higher temperatures. The reaction can proceed at temperatures as high as 220 degrees Fahrenheit, and sometimes higher depending on the boiling point of water in a particular atmosphere. In general practice of system 100, the temperature can be in the range of about 175 to about 195 degrees Fahrenheit, or can be in the range of about 180 to about 190 degrees Fahrenheit. The reaction can be controlled by increasing the temperature to produce more hydrogen or lowering the temperature to produce less hydrogen. The reaction can also be controlled by adding additional catalyst, aluminum, and/or aqueous medium to increase or maintain hydrogen production, or by removing any of the catalyst, aluminum, or aqueous medium to slow or speed up the production of hydrogen.

Tank 202 can further comprise heating element 222 which can provide heat to initiate the reaction, if necessary. Heating element 222 can be operably connected to heat source 204, which can be any generic coil heater, such as a 120 V heater manufactured by Tempco, USA, and can provide heat to heating element 222 up to, for example, 250 degrees Fahrenheit. Heat source 204 can be battery operated either by its own battery supply, or can be connected to a battery that supplies electricity to other parts of the vehicle or device, such as to a standard car battery, or can be powered by another power source. In some embodiments of the invention, heat source 204 can be adapted to alternately provide a source of coolant to tank 202 in order to cool and thereby slow the hydrogen-producing reaction of slurry 210. In some other embodiments, such a cooling action on the hydrogen-producing reaction of slurry 210 can be provided by an alternate mechanism (not shown). In embodiments in which the systems of the present invention are accommodated by and integrated with a vehicle, such as a passenger vehicle, coolant, such as Freon, R134, R134a can be borrowed from the vehicle's air conditioner and directed to a heat exchanger of cooling loop goes directly or indirectly or from another device. The coolant and/or reactants can be pumped through the system of the present invention to slow/cool reaction in pressurized piping. The system will re-cycle the Freon/similar material(s) while maintaining the air conditioning system in the vehicle intact for use.

Once the reaction is initiated by heating element 222, the reaction can be generally maintained by the heat of the reaction and cooling from the engine of other devices. In order to monitor the temperature of slurry 210, tank 202 can further define opening 237, which can securely accommodate temperature probe 226. Temperature probe 226 can be operably connected to a labjack (or PLC) 238 whereby it can detect the temperature of slurry 210 for various reasons, such as to ensure that the temperature is suitable to maintain the hydrogen-producing reaction but not high enough to cause a safety concern. For example, a suitable temperature can be between about 180 degrees Fahrenheit to about 200 degrees Fahrenheit. The temperature information collected by temperature probe 226 can be relayed by known methods, such as through a USB or PLC or computer, as described further below, to heat source 204, which can provide more heat or less as needed according to a predetermined desired temperature range.

Tank 202 can further comprise stirring device 208, which can comprise central shaft 216, propeller 214, which can comprise blades 214a and 214b, and burnishing wheel 212. Central shaft 216 can be operably bound to belt 218, which can be connected to motor 220. Motor 220 can be a standard AC 120 V motor, and can operate by battery, including a battery that is supplying electricity to other devices, such as heat source 202, such as a standard car battery or can be powered by another power source. When in operation, stirring device 208 can have various functions, including to mix and maintain slurry 210 in order that the starting materials mix as homogeneously as possible and continue to react in such a way as to produce a steady supply of hydrogen that can be regulated (i.e., slowed or sped up as required by the engine being fueled. Stirring device 208 can operate such that blade 216 rotates propeller 214 and burnishing wheel 212 in a counter-clockwise or clockwise manner. Blades 214a and 214b can be angled such that when stirring device 208 is in operation, the contents of slurry 210 are pushed down towards burnishing wheel 212. For example, blades 214a and 214b can be angled at about 45 degrees from the horizontal plane. Burnishing wheel 212 can be made of various inert, durable materials, such as stainless steel, such as, for example, type 304 stainless steel, and can have a suitable bore size, such as a 0.5 inch bore size to accommodate blade 216. Burnishing wheel 212 can be various shapes, such as circular or polygonal. For example, burnishing wheel 212 can be a triangular shape, as shown in FIG. 2, or a quadrilateral shape. Burnishing wheel 212 comprises edges 213 (if burnishing wheel 212 is circular, there would be one edge). Burnishing edges 213 can be serrated and can be razor sharp, a circular example of which is shown in FIG. 2.1. Burnishing wheel 212 can serve various functions when stirring device 208 is in operation. For example, burnishing wheel 212 can contribute to the mixing of slurry 210 and it can contribute to the removal of any oxides that build up on the surface of the aluminum. When oxides build up on the surface of the aluminum, the hydrogen-production reaction can be slowed and/or be less efficient. Therefore, when stirring device 208 is in operation, slurry 210 is mixed and continuously pushed down by propeller 214 towards burnishing wheel 212, where any oxides that have formed on the surface of the aluminum are substantially mechanically agitated and removed. Other methods and means to remove oxides from the surface of the aluminum are contemplated as part of the invention, as needed, including chemical means, such as adding gallium to slurry 210, and electrolysis, where minimal amounts of electrolysis are provided to slurry 210 by methods known to those skilled in the art.

As hydrogen is emitted from slurry 210 within tank 202, pressure can increase within tank 202. This can be beneficial in order to drive the hydrogen through the remainder of hydrogen production system 100. However, safety precautions are necessary in order to prevent the pressure from reaching unsafe levels. Increased pressure can cause slurry 210 to expand into tank 202. As a safety precaution, tank 202 can further comprise level shutoff sensor 206. Sensor 206 can detect whether the level of slurry 210 rises to the level of sensor 206, which can be designated as a problem or warning level, and thereby send a message to alleviate the problem by, for example, releasing pressure as described by the methods herein or draining slurry. For example, as described further below and/or as contemplated in some embodiments of the present invention, there can be two mechanical blow off valves (one in each reactor), which can be monitored by software that will notify an operator if levels/pressures/temperatures within the reactors are too high. There can also be a pre-set manual and/or mechanical relief valve.

Tank 202 also defines opening 236 which securely connects to hydrogen exit line 228. Line 228 allows hydrogen produced in tank 202 to proceed through hydrogen production system 100, to be described further below. Line 228 can be constructed of stainless steel or other sturdy, inert material and can be about 0.5 inches to about 3 inches, or about 1 inch to about 2.5 inches, or about 2 inches, or smaller or bigger, as can be determined by the skilled person for suitability for the application. According to some embodiments of the invention, line 228 can also accommodate an emergency release valve or vent, such as a pressure release valve and/or rupture disk (not shown), which will release hydrogen if the pressure in tank 202 or system 100 reaches an unacceptable temperature and/or pressure level. What defines an unacceptable level can vary widely depending on which application or use the reaction vessels of the present invention are designed for. For example, reaction vessels of the present invention can be constructed by known methods to be able to withstand pressures as high as about 10,000 psi or higher and up to about 1500 to about 2500 degrees Fahrenheit or higher. Such a design can support a flow rate of hydrogen that can be suitable for larger applications, such as a power station or a larger generator. For other designs, such as systems of the present invention that can be integrated with a passenger vehicle, the pressure and temperature limit of the reactors can be about 150 psi and about 350 degrees Fahrenheit, in which case the hydrogen-production reaction can be maintained at a pressure of about 70-80 psi and a temperature of about 180-205 degrees Fahrenheit in order to remain within safe reaction conditions and avoid any safety hazards. In addition, should sensor 206 detect that slurry 210 has risen to an unsafe level, the emergency release valve can be opened to release any hydrogen pressure build-up in system 100.

According to some embodiments of the invention, tank 202 can further define opening 223, which can be securely connected to connecting pipe 224. Opening 223 can be situated below the surface of slurry 210 such that slurry 210 can access and pass through opening 223 and into connecting pipe 224 (described further below). Connecting pipe 224 can have a diameter of about 0.5, about 1, about 1.5, about 2 inches, or about 3 inches, or any diameter suitable to accommodate the passing of slurry 210 from tank 202.

Figure 3:
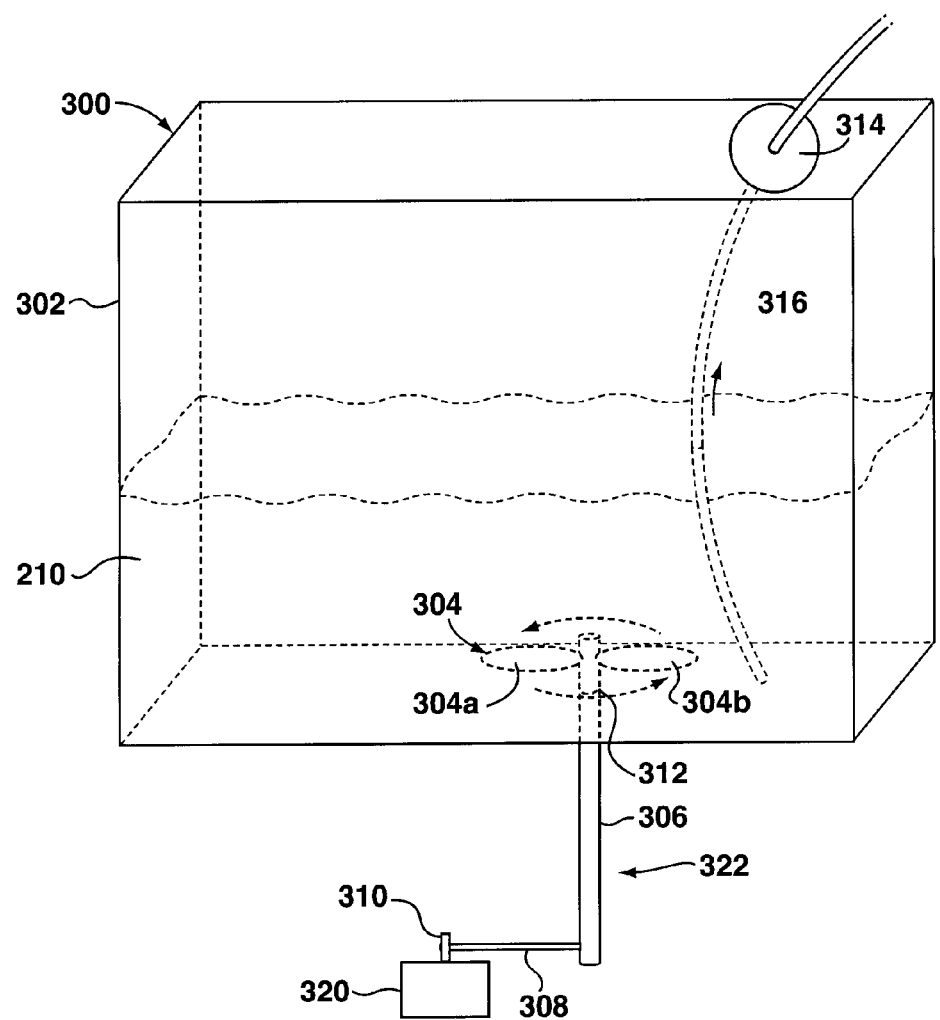
FIG. 3 is a schematic diagram of a pre-mixing vessel in accordance with some embodiments of the present invention.

Turning now to FIG. 3, pre-mixing station 300 is shown in accordance with some embodiments of the invention. Pre-mixing station 300 can receive the starting materials in order to pre-mix slurry 210 and have it ready to provide to tank 202. Station 300 can comprise tank 302 in which slurry 210 is mixed. Tank 302 can be generally be of any practical shape and size. For example, it can be cubic, rectangular, or spherical and have dimensions of about 32 inches by about 12 inches by about 9 inches or a similar spherical diameter. It can be made of any sturdy material, such as industrial plastic, laboratory grade glass, or stainless steel. Tank 302 defines opening 312 through which stirring device 322 can be securely accommodated. FIG. 3 shows opening 312 at the bottom of tank 302, but the skilled person would understand that opening 312 could be found at other locations, such as one or more of the sides or the top of tank 302. Stirring device 322 can comprise propeller 304, comprising blades 304a and 304b. The skilled person would understand that fewer or more blades would be suitable for any of the stirring devices described herein and in accordance with the invention. Stirring device 322 can further comprise shaft 306 which can accommodated by opening 312 and which can be connected to propeller 304 or directly to rotating blades 304a and 304b. Shaft 306 can be rotated by belt 308, which itself is rotated by shaft 310. Shaft 310 can be connected to motor 320. Motor 320 can be any generic motor, such as a 120 V motor. The skilled person would understand that there can be many variations to stirring device 322, and all are acceptable as long as the slurry is stirred in order to be ready to enter tank 202, which will now be described.

Tank 302 further defines opening 314, which can securely accommodate pump line 316. Pump line 316 can have a diameter of about 0.5, about 1, about 1.5, or about 2 inches or about 2.5 inches, or about 3 inches, or any diameter suitable to accommodate the passing of slurry 210 from tank 302. Pump line 316 must extend far enough into tank 302 in order to be immersed in slurry 210 when it is desired to transfer slurry 210 to tank 202. Referring back, now, to FIG. 2, the end of pump line 316 that extends from tank 302 can be connected to inlet 242. Inlet 242 connects pump line 316 to slurry pump 232, which can be any generic pump, such as Moyno 500, Model 33259. Slurry pump 232 can be functional to provide slurry 210 to tank 202 at a reasonable rate, such as a rate of about 0.25 to about 10, from about 0.5 to about 5, to about 5 gallons per minute (GPM). For example, slurry pump 232 can provide slurry to tank 202 at a rate of 0.5 GPM. The size and capabilities of the pump can vary depending on the application of system 100, and can be upgraded to provide slurry at a rate of, for example, about 15 GPM, and even higher. Slurry pump 232 can be operable to provide slurry 210 to a pressurized region, since there may be back pressure from tank 202. For example, slurry pump 232 can be operable to pump slurry 210 into a region having a pressure of about 70 psi to about 125 psi, or other pressure as can be determined by a person skilled in the art.

Slurry pump 232 can also comprise outlet 244, which can be securely connected to outlet pump line 230. Outlet pump line 230 can be securely connected to opening 234 and can have the same physical and material characteristics as pump line 316. Pump line 230 can further comprise check valve 240, which can be operable to remain intact within normal pressure ranges of reactor 202. Check valve 240 can act as a one-way flow preventer to prevent any back flow of hydrogen or slurry 210 from tank 202.

Pre-mixing station 300 can provide slurry 210 to tank 202 before the hydrogen-production reaction is initiated in tank 202 or it can add additional slurry 210 to tank 202 while the reaction is underway in order to maintain the reaction. In some embodiments of the invention, pre-mixing station 300 can be used to add any one or a combination of starting material(s) or other component of slurry 210, such as, for example, aqueous medium, a slurry of aluminum, or a slurry of catalyst, or combinations thereof.

Figure 4:
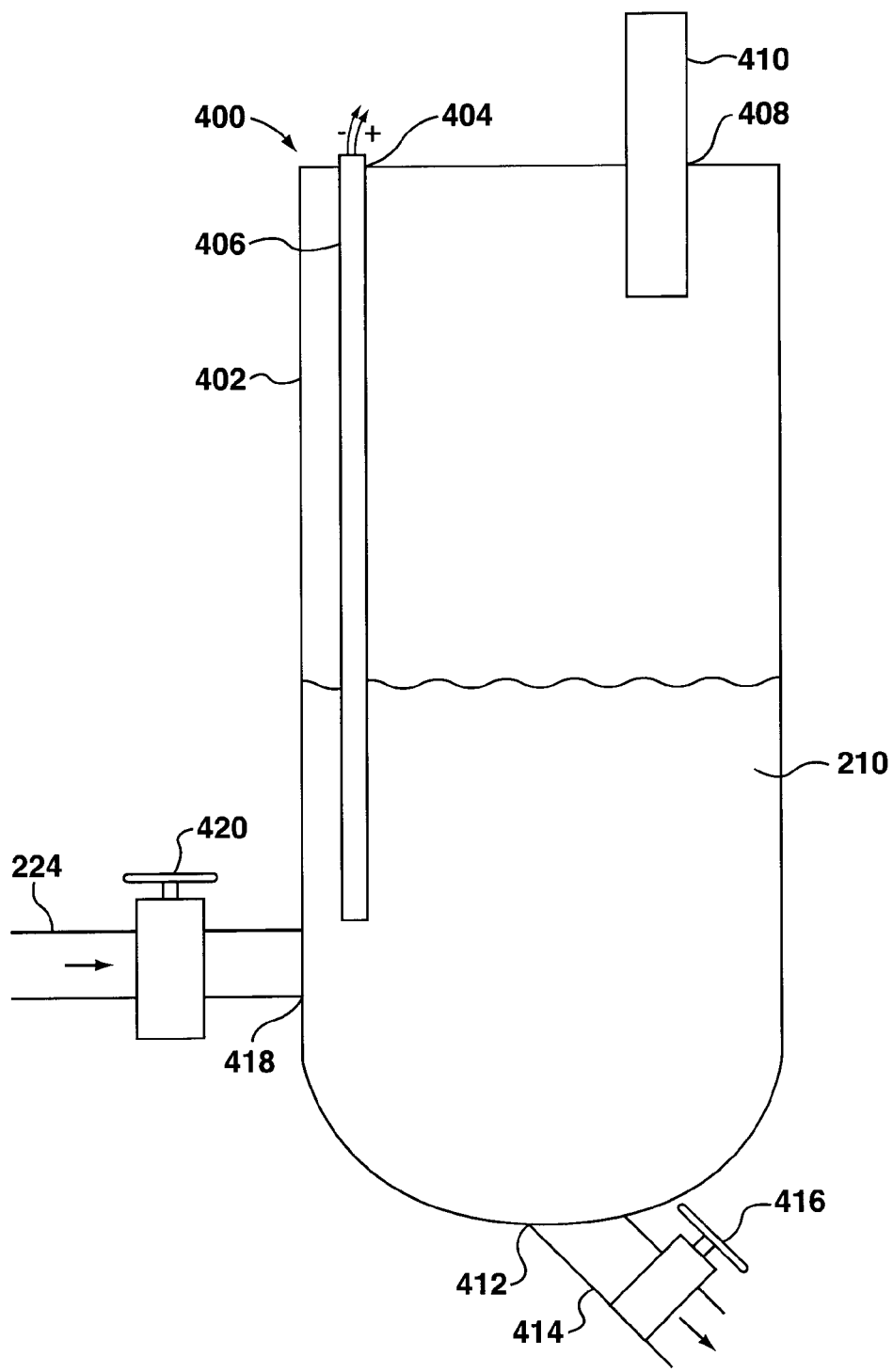
FIG. 4 is a schematic diagram of a secondary reactor vessel in accordance with some embodiments of the present invention.

Referring now to FIG. 4, secondary reaction vessel 400 is shown. Secondary reaction vessel 400 can be useful to provide an additional site for slurry 210 to undergo the hydrogen-production reaction. Providing multiple reaction vessels in accordance with some embodiments of the present invention can provide additional surface area from which hydrogen can be emitted from slurry 210 while providing additional structural constraints and safety checks/valves to system 100. Further, providing multiple reaction vessels can add practical options when designing or adapting a vehicle or device, including any and all internal combustion engines or fuel cells to be fueled by the hydrogen of the present invention. For example, it may be easier to incorporate the addition of two smaller reaction vessels in terms of volume and weight as opposed to one larger reaction vessel into a medium-sized passenger vehicle. However, some embodiments of the present invention do contemplate the use of one larger reaction vessel or multiple reaction vessels combined, and yet other embodiments contemplate a mixture of larger and smaller reaction vessels. The skilled person would know how to adapt the hydrogen-production system of the present invention to suit the specific hydrogen requirements of any vehicle or device or other user of the hydrogen produced by the present invention.

Secondary reaction vessel 400 can comprise tank 402 which defines opening 418. Tank 402 can have the same or similar physical and material characteristics as tank 202. Opening 418 can be securely connected to connecting pipe 224 in order to receive slurry 210 from tank 202. Connecting pipe 224 can comprise shut-off valve 420, which can have a suitable pressure rating, such as about 150 psi, and can function to open or close the flow of slurry 210 from tank 202 to tank 402 through connecting pipe 224. During operation of hydrogen-production system 100, slurry 210 can pass from tank 202 to tank 402 as a result of the pressure from hydrogen production in tank 202 or via a gravity-fed drain. Tank 202 and 402 can be situated to be upright and generally parallel to each other so that the levels of slurry 210 equilibrate as the pressure and amount of slurry 210 in each tank equilibrates. In addition, in order to assist the flow of slurry 210 from tank 202 to 402, tank 402 can be situated generally below tank 202 in order to take advantage of gravitational forces on the flow of slurry 210.

Tank 402 further defines opening 404 in order to accommodate temperature probe 406, which can monitor the temperature of slurry 210 in tank 402. Temperature probe 406 can function in the same manner as temperature probe 226 (shown in FIG. 2). Slurry 210 in tank 402 may not need to be heated by a heating element similar to heating element 222 (shown in FIG. 2) since there will be heat supplied through slurry 210 as well as the sustaining heat of the vehicle or device, including any and all internal combustion engines or other device that burns hydrogen to create heat for various purposes, which can accommodate hydrogen-production system 100. For example, the motor of a vehicle such as a medium sized car can reach a temperature of about 25 to 30 degrees Fahrenheit, which will sustain the hydrogen-producing reaction. Other sources of heat include electrical power from an alternator. However, should secondary reaction vessel 400, or any other reaction vessel, not be exposed to sufficient heat to maintain the hydrogen-production reaction, secondary reaction vessel 400 and/or the any other reaction vessel can be adapted to accommodate an additional heat source 204 and heat element 222 similar to that of reaction vessel 200.

Reaction vessel 400 can further comprise a stirring device (not shown) of the sort that is used with reaction vessel 200.

Tank 402 further defines opening 412, which can be located at or near the bottom of tank 402. Opening 412 can be securely connected to drain pipe 414 which can be regulated by valve 416. Opening 412 allows the passage of by-products of the reaction, including the aqueous medium, catalyst and cationic aluminum ($Al^{3+}$), which may be in the form of $Al_2O_3$ or $Al(OH)_3$ and/or other aluminum oxides or hydroxides. The catalyst can be separated from the aluminum oxides by methods known in the art, such as by standard separation techniques. For example, the by-products of the hydrogen-production system can be retrieved as a slurry mixture from system 100 which has been integrated with a standard passenger vehicle. The by-products can be transferred into a bucket or holding device and allowed to sit a sufficient time, such as for about 40 minutes, to allow sufficient separation of the components. The aluminum oxide can sink to the bottom to form a bottom layer, the carbon-based catalyst can reside in the middle to form a middle layer, and the aqueous medium can form the top layer. Any of these layers can be easily extracted with a pump or a strainer. This separation could be adapted to be a quick and easy industrial process. The catalyst can be re-used or reactivated as necessary according to methods provided by the catalyst manufacturer.

Tank 402 can further define opening 408, which can be located at a position above the surface of slurry 210. Opening 408 acts as an exit point for the hydrogen produced in tank 402. Opening 408 can securely connect to hydrogen exit line 410. Line 410 can allow hydrogen produced in tank 402 to join line 228 (see FIG. 2) at junction 502 (see FIG. 5) so that the hydrogen produced from reaction vessel 200 and reaction vessel 400 can commingle and proceed through hydrogen production system 100 via line 504. Lines 410 and 504 can have the same or similar physical and material characteristics as line 228 (described above). According to some embodiments of the invention, line 410 can accommodate an emergency release valve (not shown), which can release hydrogen from system 100 either by manual release or automatically similarly to the procedure described above for the emergency release valve related to line 228.

Figure 5:
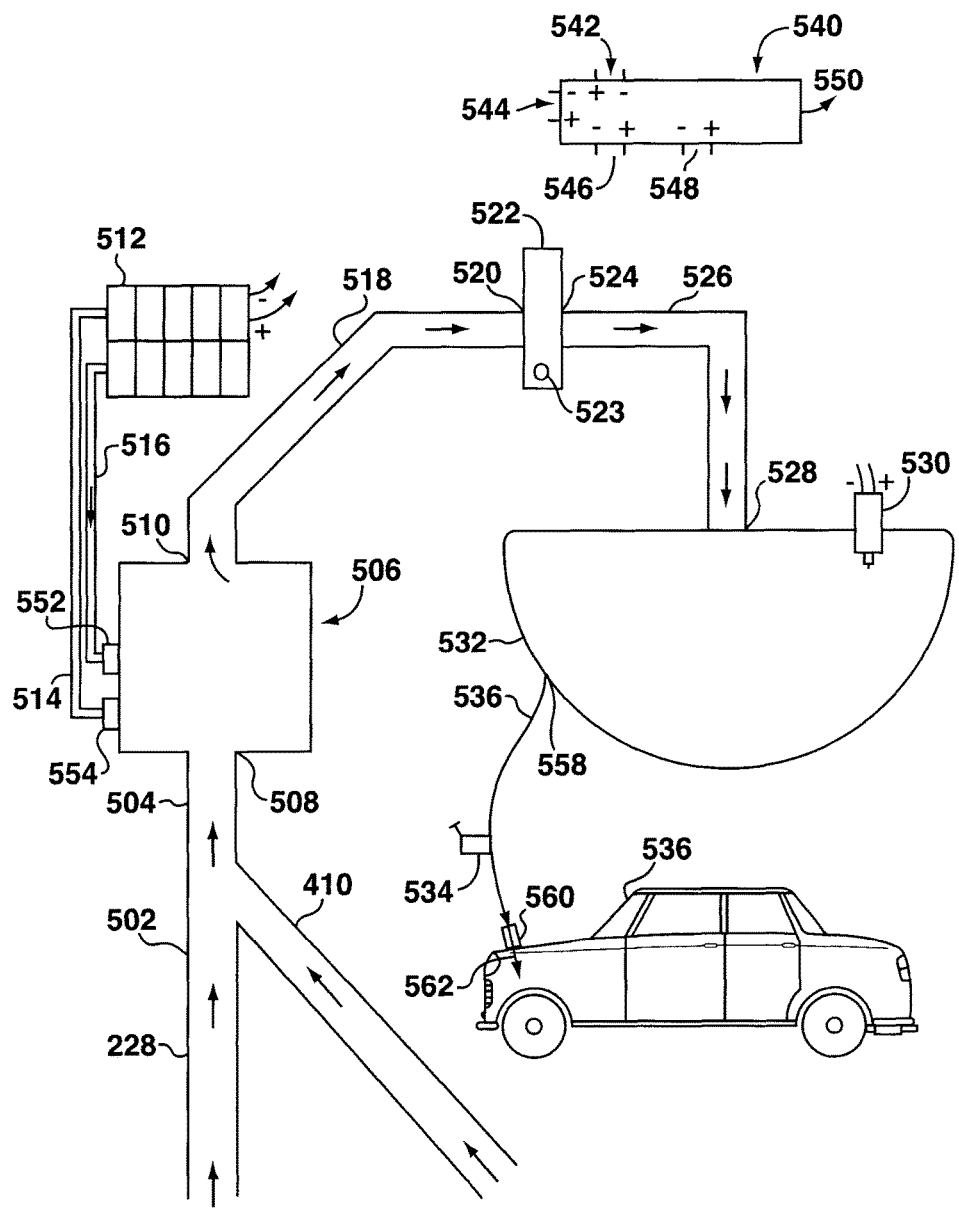
FIG. 5 is a schematic diagram of elements of the hydrogen-production system in accordance with some embodiments of the present invention.

Referring now to FIG. 5, line 504 is shown securely connected to cooler 506 via hydrogen inlet 508. Cooler 506 can cool the hydrogen to a temperature below the temperature of reaction vessel 200 or reaction vessel 400. Hydrogen that passes into hydrogen inlet 508 can be at a temperature as high as about 200-250 degrees Fahrenheit. Cooler 506 can cool the hydrogen down to a temperature in the range of about 80-90 degrees Fahrenheit, or generally to room temperature. It will be recognized by the skilled person that many methods known to the skilled person can be suitable to cool the hydrogen and are embodiments of the present invention. It will further be recognized by the skilled person that a cooling mechanism may not be required as part of the hydrogen-production system of the present invention, depending upon the temperature requirements of the end use of the hydrogen and any inherent cooling of the hydrogen that may occur in system 100.

In this embodiment, cooler 506 can function via operation of water radiator and pump 512. Cooler 506 can further comprise a fan (not shown). Water radiator 512 can be connected to one end of water line 516. Cooler 506 can comprise water line inlet 552, to which the distal end of water line 516 is securely connected. Within cooler 506, as will be understood by the person skilled in the art, cold water can be circulated within gas impermeable tubing in order to cool the gas that passes around it. During this process, the water warms as the hydrogen cools. Warmed water can exit cooler 506 via water line outlet 554 and is returned to radiator 512 via water line 514. Cooled hydrogen exits cooler 506 via hydrogen outlet 510 which can be securely connected to line 518.

System 100 can further comprise dryer 522, which can comprise dryer inlet 520 and dryer outlet 524. Line 518 can securely connect to dryer inlet 520 in order to direct the hydrogen produced by system 100 through dryer 522. Dryer 522 can be designed to remove moisture from the hydrogen flowing through it. Dryer 522 can be any commercial drying system (such as a system manufactured by Parker Watts) that can operate under high pressures (such as up to 150 psi). Dryer 522 can have the dimensions of about 12 inches by about 4 inches by about 4 inches and can contain silica gel as a primary drying agent. For example, it can contain about a third of a pound (lb) of 3 mm grains of silica gel or other desiccant. The skilled person would understand that other known or soon to be known drying agents can be suitable for the present invention. Silica gel is blue when it is dry and generally able to absorb/adsorb and retain moisture from the atmosphere that it is in. It is pink when it is generally not available to absorb/adsorb and retain more moisture. Dryer 522 can further comprise viewing window 523 so that a user or operator can view the silica gel and determine whether it needs to be replaced or reactivated by the colour of the silica gel. Dryer 522 can contain the means (not shown) to allow the user to remove the silica gel when system 100 is not in operation. Silica gel can be reactivated by methods known to those with skill in the art. For example, silica gel can be reactivated by drying it in an oven until it returns to a blue colour. The cooled, blue silica gel can then be replaced into dryer 522 for re-use. In some embodiments, dryer 522 can be adapted to reactivate the drying agent in situ.

It will be understood that there can be applications of the hydrogen produced by the hydrogen-production system of the present invention that do not require dried hydrogen, such as a boiler application or a less precise combustion technique. For those applications, dryer 522 can be omitted from hydrogen-production system 100 according to some embodiments of the present invention.

Dryer outlet 524 can be securely connected to line 526, which can lead directly to a vehicle or device to be used as fuel, according to some embodiments of the present invention. According to the embodiment shown in FIG. 5, line 526 can lead to and can be securely connected to collection tank 532 via connection 528. Collection tank 532 can act as a reservoir for the hydrogen produced by hydrogen-production system 100. Collection tank 532 can have a suitable capacity, such as about 50 L capacity, and can be constructed of a material that can withstand high pressures. For example, collection tank 532 can be constructed of iron or an amalgam of iron, stainless steel, carbon fiber tanks, and/or can be a CNG/propane certified tank. and be able to withstand pressures of up to 300 psi for some applications and even as high as 10,000 psi or higher in other applications.

Collection tank 532 can be operably connected to transducer 530, which can measure the end-of-line pressure of the hydrogen. Collection tank 532 also defines opening 558 through which the hydrogen can flow out of tank 532. Opening 558 can be connected to tubing 556, which can be connected to or form outlet 560, through which hydrogen flows to be delivered to the desired vehicle, device, or the like. Tubing 556 can be comprised of industrial plastic tubing with a ½ inch diameter which is rated to withstand up to 200 psi or higher. The skilled person would understand, however, that the physical characteristic and materials of tubing 556 can be varied and are contemplated as being part of the present invention. Tubing 556 can also comprise flow meter 534, which can control the rate at which the hydrogen is delivered from outlet 560. One example of many of suitable flow meters is the King flow meter, 100 psi unit (model #17530111201). As described above, in other embodiments of the present invention, the flow meter can be functional for pressures up to 10,000 psi or higher. The flow meter can facilitate a 'steady flow' of hydrogen, which can function suitably with engines and other applications as would be recognized by the skilled person. The flow rate according to some embodiments can be about 180-190 LPM (Liters Per Minute. US). Outlet 560 can be connected to or form part of feed line 562, which can be used to deliver hydrogen to a desired location in the vehicle or device. It will be recognized by the skilled person that flow meter 534 can be located at outlet 560, in which case feed line 562 can be connected to and receive hydrogen from flow meter 534. As an example of delivery of hydrogen to a vehicle, which can be a car, as shown in the embodiment shown in FIG. 5, feed line 562 can be inserted through the air intake or directly injected into the car to replace the original primary fuel.

Various components of hydrogen-production system 100 can be electrically powered, such as, sensor 206, temperature probes 226 and 406, motors 220 and 320, heat source 204, pumps 232, water radiator and pump 512, and transducer 530. These components can be individually battery powered according to methods that can be determined by the skilled person. Alternatively or in addition to, the hydrogen-production system of the present invention can further comprise main hub 540, which can act as a hub for the electrical connection of these components. Main hub 540 can receive its power from a central battery (not shown). Main hub 540 can further comprise a universal serial bus (USB) or programmable logic controller (PLC) or central processing unit (not shown) which can collect feedback information about the temperature, flow, pressure, and other properties from the different regions within hydrogen-production system 100. This information can be fed to a computer in order to automatically or manually monitor the hydrogen-production system during operation.

As hydrogen is produced in reactor vessel 200, the pressure within tank 202 can increase from the atmospheric pressure within tank 202. For example, in some embodiments, the pressure can be about 70-80 psi when system 100 is integrated with a medium sized car, and as discussed herein, the pressure can reach 10,000 psi or higher in some applications. Therefore, tank 202 must be constructed to be able to withstand such pressures. In addition, all of the connection points between components of system 100, such as at openings 234, 238, 223, 418, 404, 412, 408, 508, 510, 520, 524, and 528, and junction 502, must be able sufficiently sealed to remain intact under the normal pressures of system 100 according to methods known by the skilled person. Generally, pressure can be contained in reaction vessels with check valves and approved pressure-tubing and pressure-rated devices. The skilled person would understand that keeping pressure in a system is dependent on the 'plumbing' aspect as well as the housing device (reactors) and that every piece of plumbing connection can be rated for double the pressure limits of the particular system of the present invention. For example, every joint can wrapped with thread-sealed tape and approved for holding pressure indefinitely. In addition, all of the connections and the material used for the tanks, tubing, pipe, and lines, for example, must be as gas tight as possible in order to maintain the efficiency of hydrogen production of system 100.

System 100 can be designed so that, during operation, the hydrogen-production reaction occurs spontaneously and quickly once a sufficient temperature is achieved, although the reaction conditions can be controlled in order to slow down the reaction. For example, a reaction of about 8.9 kg of aluminum can create about 1 US GGE (gallon of gas equivalent) of hydrogen almost instantly under certain reaction conditions, or the reaction can be slowed down to a few minutes depending on the collection tank size/particular application/technique of dealing with the influx of gas. In some embodiments, 80 psi can be reached in 5 seconds, or 5 minutes depending on the technique or the amount of reactants within the reactor at time of temp activation. Flow/generation rates are all based on the application. The skilled person would understand that reaction conditions can be adjusted so that the reaction proceeds very quickly or very slowly, depending on the application needs.

In order to start the reaction, slurry 210 can be pumped into tank 202 with pump 232 through line 230. Once a desired amount of slurry 210 is added to tank, any back-flow of slurry 210, liquid, or gas into pump 232 can be prevented by valve 240. Heat can then be provided to slurry 210 by heat element 222. The temperature of slurry 210 can be brought up to about 73 degrees Celsius, or to about 82 degrees Celsius, or to about 85 degrees Celsius, at which point the reaction will initiate. In embodiments where hydrogen-production system 100 is situated in proximity to the motor or fuel cell that uses the hydrogen is fuel, such as when system 100 is adapted to be situated in a vehicle such as a car, the heat generated by the motor will usually be sufficient to maintain the reaction, and the heat element can be turned off. The heat element can be operated by a feedback system whereby information can be provided to a USB or central processing unit or the like from temperature probes 226 and/or 406 and then the USB or central processing unit can calculate whether further heat from heat element 222 is required. If it is not required, heat source 204 can be turned off. Heat source 204 can be turned on again if the temperature in tank 202 or 204 falls below a certain level.

Additional starting material can be added to tank 202 while the tank is under pressure. For example, the Moyno pump can pump slurry 'into' pressures at up to 100 psi. In operation, the operator can send a signal to turn pump 232 on in order to inject additional starting materials into reactor vessel 200 when additional hydrogen is required.

In order to stop the hydrogen-production reaction, once the vehicle is turned off, the cooling of the system will stop the reaction. Other methods of stopping the reaction can include flushing slurry 210 with a hose-fitting (not shown) located on top of tank 202 to remove slurry, dropping the temperature of the reaction, or removing water from slurry. Once cooler water enters tank 202, any temperature build will be slowed. Valve 420 can also be opened, if it is not already and then valve 416 can be opened. Slurry 210 can then exhaust the entire system and water (from hose bib, not shown) will carry all reactants outside of reactor. When the temperature drops, the reaction can stop shortly thereafter. Another method to stop the reaction can include cooling lines (not shown), which can be, in some embodiments air conditioning lines in a car. The cooling lines can slow the reaction down very quickly. Slowing or stopping the reaction can be temperature based, so any technique for dropping the pressure of the reaction can slow/stop reaction.

In some embodiments of the present invention, pressure can reach about 70-80 psi within tank 202 within seconds. If a secondary reaction vessel is being used as in the embodiment described above, the pressure will climb to about 70-80 psi as the hydrogen-production reaction proceeds. The hydrogen and associated elevated pressure will spread along the connecting lines through cooler 506 (if used) through to dryer 522 (if used) and accumulate in collection tank 532. This process can appear almost instantaneous to a user, depending on the reaction conditions of system 100, and hydrogen can be available for use within a relatively short period of time.

Figure 6:
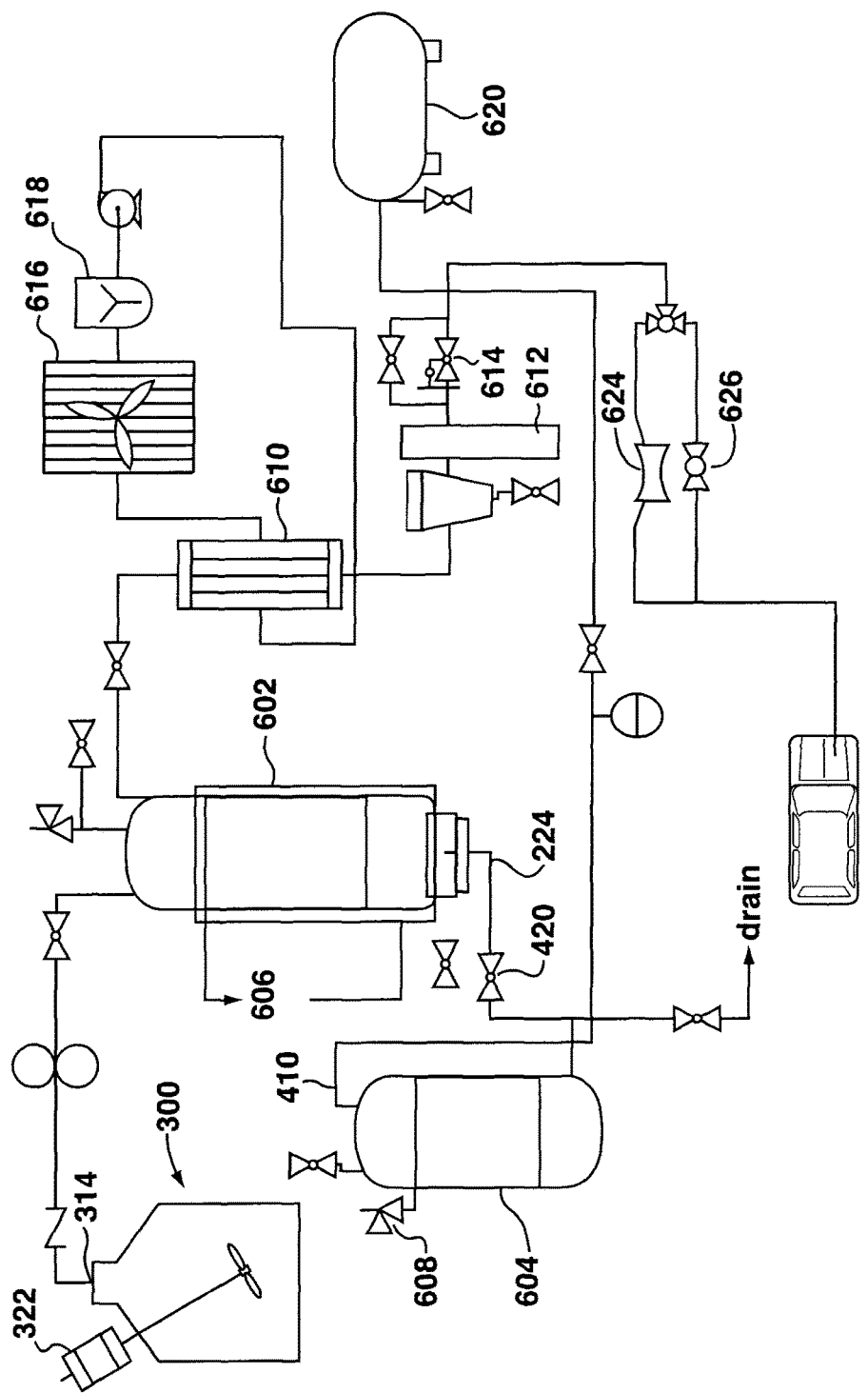
FIG. 6 is a schematic diagram of a hydrogen production system according to another embodiment of the present invention.

Referring now to FIG. 6, another embodiment of the present invention is shown in which cartridges 602 and 604 replace the function of tank 202 and 402 described above. Cartridges 602 and 604 can range from pop-can size canisters (similar dimensions) to 50 kg drums (similar dimensions to a keg). An inlet (on top) and outlet (on bottom) of cartridges for hot water can be present. Inside the cartridges (which can be of aluminum construction or other suitable material, such as stainless steel) can be packed with approximately 30 micron pure aluminum powder or a suitable amount of recycled aluminum, solid bars or aluminum, shavings, etc, or mixtures thereof. In some embodiments, cartridges 602 and 604 can hold pressures of between about 40 psi and about 250 psi depending on application. Cartridges for a vehicle can be larger than cartridges for, as an example, a small personal sized generator or smaller than cartridges or other reactors used, for example, for an electricity generating power plant. Cartridges can be designed depending on the needs of the application. They can be self-contained and easily removable and can replace the stationary reactor design (for certain applications) described in respect of system 100. In this embodiment, slurry does not need to be premixed because the aluminum can already be present in the cartridges. In preferred embodiments, the cartridges can contain aluminum and catalyst, and can be sold as a unit, so that only aqueous medium would be required to be added. In this embodiment, reactor 602 can be surrounded by jacket 606, which can circulate engine coolant to cool (slow) the reaction or can function as a heater. The embodiment shown in FIG. 6 can also comprise rupture disk 608, cooling device 610, dryer 612, back pressure regulator 614, air conditioning unit 616, air conditioning unit filter 618, buffer tank 618, buffer tank 620, flow meter 624, and by-pass valve 626.

Figure 7:
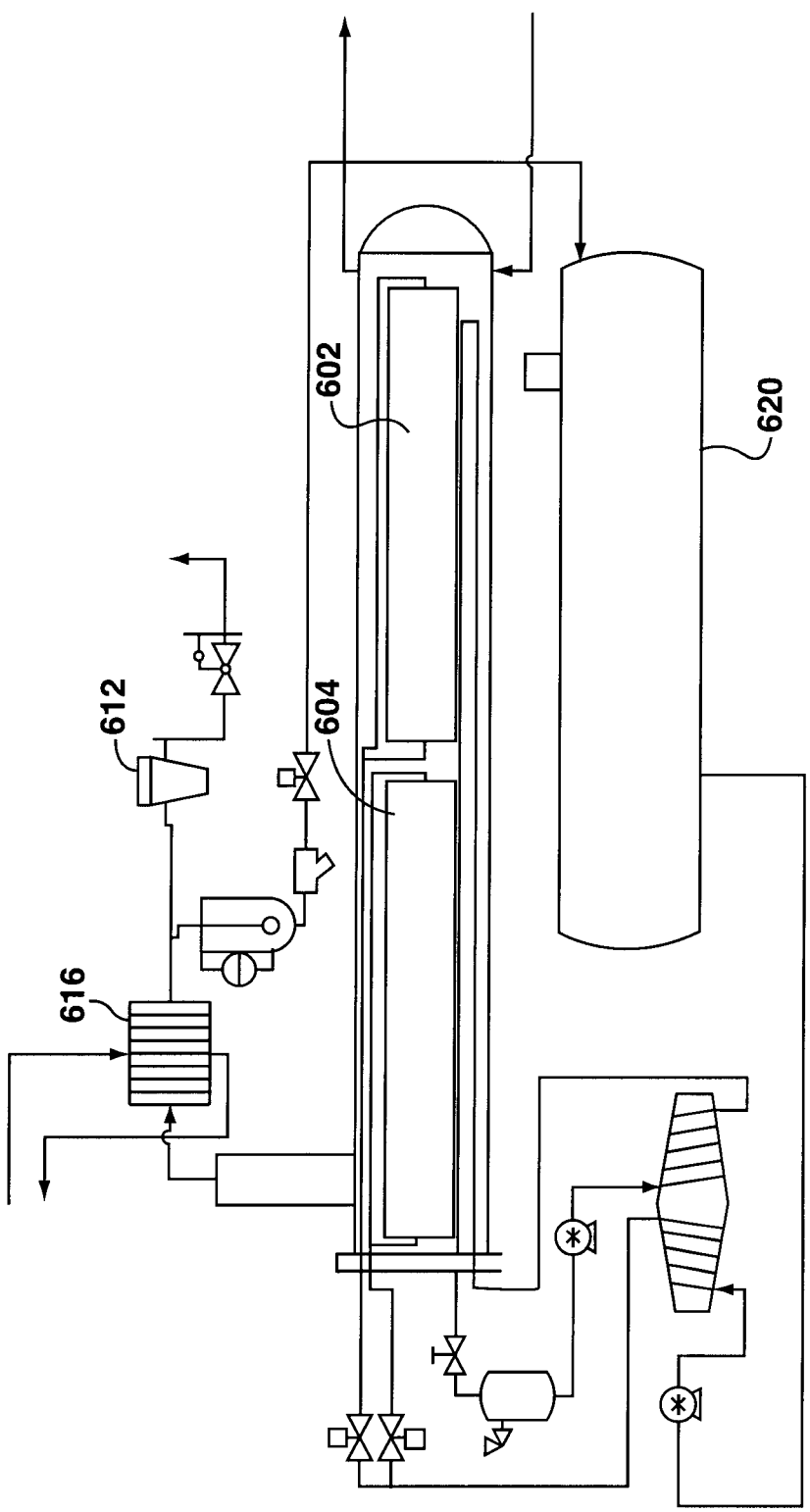
FIG. 7 is a schematic diagram of a hydrogen production system according to another embodiment of the present invention.

FIG. 7 shows a variation in configuration of the cartridges of the embodiment shown in FIG. 6. In this embodiment, reactors 602 and 604 can hold about 0.75 to about 2 kilograms of aluminum in various forms, and can be cartridges as described below.

According to one embodiment of the present invention, the cartridges can hold aluminum or other suitable metal and a suitable synthetic or natural wool fiber medium (referred to herein as wool medium). The aluminum or other suitable metal and wool medium can be mixed to form a mixture. The inventor has surprisingly found that a mixture of these components is effective at producing a usable source of hydrogen when it is exposed to an aqueous medium and heat. The wool medium can be synthetic or from a natural source. For example, the wool can be kaowool or other suitable alkaline earth silicate wool product. The wool can be obtained from natural sources, such as from sheep and certain other animals, including cashmere from goats, mohair from goats, qiviut from muskoxen, angora from rabbits, and other types of wool from camelids, and can be a mixture thereof. The wool can be clean, packed loosely or densely, and generally free of dyes and other additives.

The aluminum or other metal can be, for example, aluminum or a mixture or alloy of aluminum and another metal, such as gallium, magnesium, or boron or compounds containing these metals. The aluminum or other metal can be in the form of shavings, powder, bars, milled balls, and can be recycled. The aluminum or other metal will be referred to below as aluminum, although the skilled person will recognize that other suitable metals or electron sources can be used in place of the aluminum.

In order to prepare the mixture, the aluminum and the wool medium can be put into a blender and blended until the a substantially homogenous mixture is produced. The mixture can comprise about 40% to about 60% aluminum, or about 50% to about 60%, or about 60% to about 70%, or about 70% to about 80%, or about 80% or about 90%, or about 90% or over aluminum by total weight of the total mixture. The mixture can comprise about 3% to about 10% of the wool medium, or about 5% to about 9%, or from about 10% to about 15%, or about 15% to about 20%, or about 20% to about 30%, or about 30% to about 40%, or about 40% to about 50%, or about 50% to about 60% by weight of the total mixture. In some embodiments, the mixture can comprise about 25% wool and about 75% aluminum, or about 20% wool and about 80% aluminum, or about 15% wool and about 85% aluminum, or about 10% wool and about 90% aluminum, or about 5% wool and about 95% aluminum by weight of the total mixture. Generally, a higher percentage of wool can accelerate the hydrogen production reaction. The aluminum need not be in the same physical form, but can be a mixture of different physical forms. For example, the aluminum can be a mixture of powder and recycled shavings, or a mixture of milled balls and powder and/or shavings, or a mixture of aluminum in bar form and milled balls, powder, and/or shavings. The aluminum can be present in about 10% to 50% powder and 80% to 50% shavings, or about 20% to about 40% powder and about 70% to about 50% shavings, or about 30% powder and about 60% shavings by weight of the total mixture. Once the components of the mixture are blended, a fluffy-like, substantially homogeneous mixture can be produced and ready to use, as described further below. The mixture can be kept dry in order to be used in the hydrogen production reactions described herein. The inventor has found that when a wool medium is used as described herein, a catalyst as described above is not necessary, but can be used. The reaction between water and aluminum to produce hydrogen is thought to occur according known chemical formulae.

Figure 8:
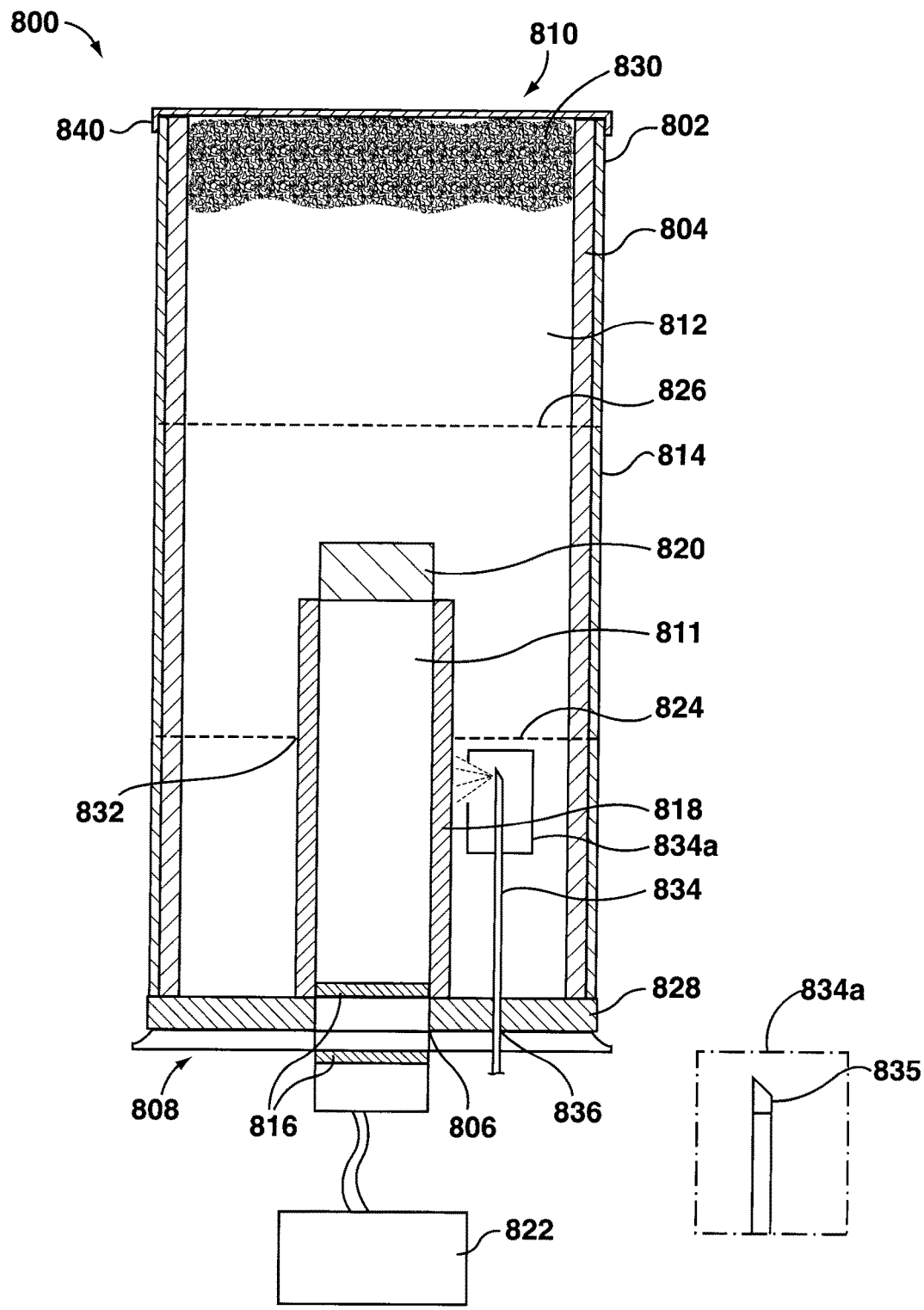
FIG. 8 is a cut-away schematic diagram of a cartridge according to some embodiments of the present invention.

Referring now to FIG. 8, a cartridge according to some embodiments of the present invention will be described. The cartridge 800 comprises housing 802 for housing the components of cartridge 800. Housing 802 comprises first end 808 and second end 810, which are connected by one or more walls 814. Ends 808 and 810 and wall 814 define cavity 812. Walls 814 can be manufactured from stainless steel or any suitable generally inert (non-reactive), high pressure material and can be comprised of materials that are suitable to house the reaction materials as described further below. Housing 802 can be of a cylindrical shape of varying size. Housing 802 can also have other shapes, such as spherical, cubic, or rectangular prismic. When cylindrical, first and second ends 808 and 810 are substantially circular and can have diameters of, for example, about 2 inches, or about 3 inches, or about 4 inches, or about 5 inches and wall 814 can have a length of about 8 to about 20 inches or longer, or about 9 inches or about 10 inches, or about 11, 12, 13, 14 inches etc. Wall 814 can be partly or substantially lined with a material 804 that can retain heat within reactor 800, such as mica, ceramic material, or a lining such as zircotec (http://www.zircotec.com). First end 808 can be lined with material 828, which can be a material such as mica or a suitable paper product. First end 808 and material 828 can commonly define opening 806, which can be generally centrally located in first end 808 and can accommodate heat source 810. Heat source 810 can comprise a hot rod, heat coil, and/or resistive diode or other suitable heating source and extend through opening 806 into cavity 812 and be secured in place by methods known by those skilled in the art. For example, ties 816 can be used to secure heat source 810 in cavity 812. Heat source 810 can have a diameter of about ⅜ to about 1 inch, or from about ⅜ to about ¾ inches, or from about ⅜ to about ½ inches and can be connected to electrical source 822 outside of housing 802. Heat source 810 can extend into cavity 812 to any suitable extent, such as 25% or about 50% or about 75% of the length of cavity 812. Heat source 810 can be covered with sleeve 818 in order to protect heat source 810 from reacting with the reactants. Sleeve 818 can comprise stainless steel, iron, or other suitable material and can be heated by heat source 810 in order to initiate and/or control the hydrogen producing reaction as described further below. Heat source 810 can be protected by cap 820, which can comprise mica or other suitable material, such as kaowool, and can function to prevent heat source 810 from being exposed to aluminum or other components from cavity 812. Cartridge 800 further comprises first flow diverter 824 and second flow diverter 826, which are both entirely disposed within cavity 812, each approximately evenly spaced along cavity 812 and generally parallel with first end 808. First flow diverter 824 can define opening 832, which can accommodate heat source 810 therethrough. First and second flow diverters are optional can function to slow down the reaction in order to produce hydrogen at a steady rate. The skilled person would understand that fewer or more flow diverters could be used in the present invention.

Cartridges 800 can be of any suitable size, such as between about 5 inches to about 60 inches, or shorter or longer, or about 9, or about 10, or about 20 or about 36, or about 40 inches.

In order to prepare cartridge 800 for use, it can be packed with materials such as aluminum and other materials suitable for producing hydrogen from an aqueous medium. The other material can be a catalyst discussed above, or wool medium or the mixture of wool medium and aluminum, as discussed above. The materials included in the reactor can be referred to as the reactants. In some embodiments of the present invention, the reactants or the mixture can be placed within cavity 812 beginning at first end 808, so that about one third of cavity 812 is filled. First flow diverter 824 can then be placed within cavity 812. Another one third of cavity 812 can be filled with the reactants and second flow diverter 826 can be disposed within. Finally, a final third of the reactants can be placed on top of second flow diverter 826. Loose wool 830, other similar material, can then be packed into the top of cavity 812 at second end 810. Loose wool 830 can function to contain the reactants within cavity 812 and can prevent extraneous material, such as dust, from entering cavity 812. In embodiments where the mixture described above is used, the mixture can be loosely or tightly packed into cavity 812. Generally speaking, the more mixture that is packed into cavity 812, the more hydrogen will be produced. Cartridge 800 can further comprise gas permeable cap 840, which can be secured to walls 814 across second end 810 in order to contain any components within cavity 812. Cap 840 can be comprised of stainless steel mesh or other suitable material, and can function to allow the hydrogen produced within cavity 812 to escape from cartridge 800. Cap 840 can also be constructed to endure the high heat associated with the hydrogen production reaction occurring within cartridge 800.

First end 808 can further define opening 836, which can accommodate spray bar 834. Spray bar 834 can be comprised of stainless steel and can be about ⅛ of an inch in diameter. Spray bar 834 can define opening 835, which can be about 1/60000 inches deep. Spray bar 834 can be connected to a water pump (not shown) that can, for example, pump water through opening 835 at about 120 psi. Opening 835 can be generally directed to sleeve 818 in order to spray water that can contact sleeve 818.

In operation, cartridge 800 is at least partially filled with, for example, a mixture or reactants or other suitable mixtures as would be understood by the skilled person. Heat source 811 can be activated through electrical source 822 in order to heat sleeve 818 to a temperature from about 400 to about 500 degrees Fahrenheit, or from about 450 to about 550 degrees Fahrenheit, or from about 500 to about 600 degrees Fahrenheit, or above about 600 degrees. Sleeve 818 can be heated until it is generally glowing red hot. Heat source 811 can be activated for a predetermined time, such as from about 10 seconds to 360 seconds, or from about 30 seconds to about 240 seconds, or from about 60 seconds to about 220 seconds, or from about 120 seconds to about 200 seconds, or about 180 seconds. When sleeve 818 is at a sufficient temperature, water is sprayed as generally fine droplets through opening 835 in order to make contact with heated sleeve 818. The amount of water that can be sprayed can be predetermined, and can be from about 50 milliliters (mL) to about 1 liter (L), or from about 100 mL to about 800 mL, or from about 200 mL to about 600 mL, or from about 250 mL to about 500 mL, or about 300 mL, about 310 mL, about 320 mL, about 330 mL, about 340 mL, about 350 mL, about 360 mL, about 370 mL, about 380 mL, about 390 mL, about 400 mL, about 410 mL, about 420 mL, or higher. Generally speaking, about 400 mL of water used in accordance with the present invention can produce about 360 L of hydrogen at about 90 psi. Once the water contacts hot sleeve 818, a reaction can occur between the aluminum contained in the mixture that is disposed within cavity 812 (with or without a catalyst) and the water in order to produce hydrogen. The reaction can occur within milliseconds or seconds and can produce hydrogen at a pressure of about 90 psi. The hydrogen production reaction that takes place in cartridge 800 can take place in an oxygen-reduced atmosphere or an essentially oxygen-free atmosphere. It is believe that any oxygen produced from the reaction (oxygen from the water molecule) can be consumed by the reaction. When the reaction is over, the cartridge can be cooled and emptied and the aluminum oxide and other byproducts can be retrieved and sent to be recharged back to aluminum. The byproducts can be retrieved by any method determined by the skilled person, including emptying the spent contents of the cartridges, grinding the spend material and subjecting it to the Hall-Heroult process. In order to produce such an oxygen-reduced atmosphere or an essentially oxygen-free atmosphere, one or more cartridges can be located in a gas-controlled container, which container can be flushed with a relatively inert gas, such as argon, before the hydrogen-production reaction is initiated. Examples of such containers are described further below.

Cartridge 800 can be used in various applications to produce hydrogen that is ready to use or that can be stored for later use. For example, a plurality of cartridges 800 can be arranged to supply hydrogen simultaneously or in a sequential fashion. An embodiment of the present invention in which a plurality of cartridges 800 are assembled for use will now be described.

Figure 9:
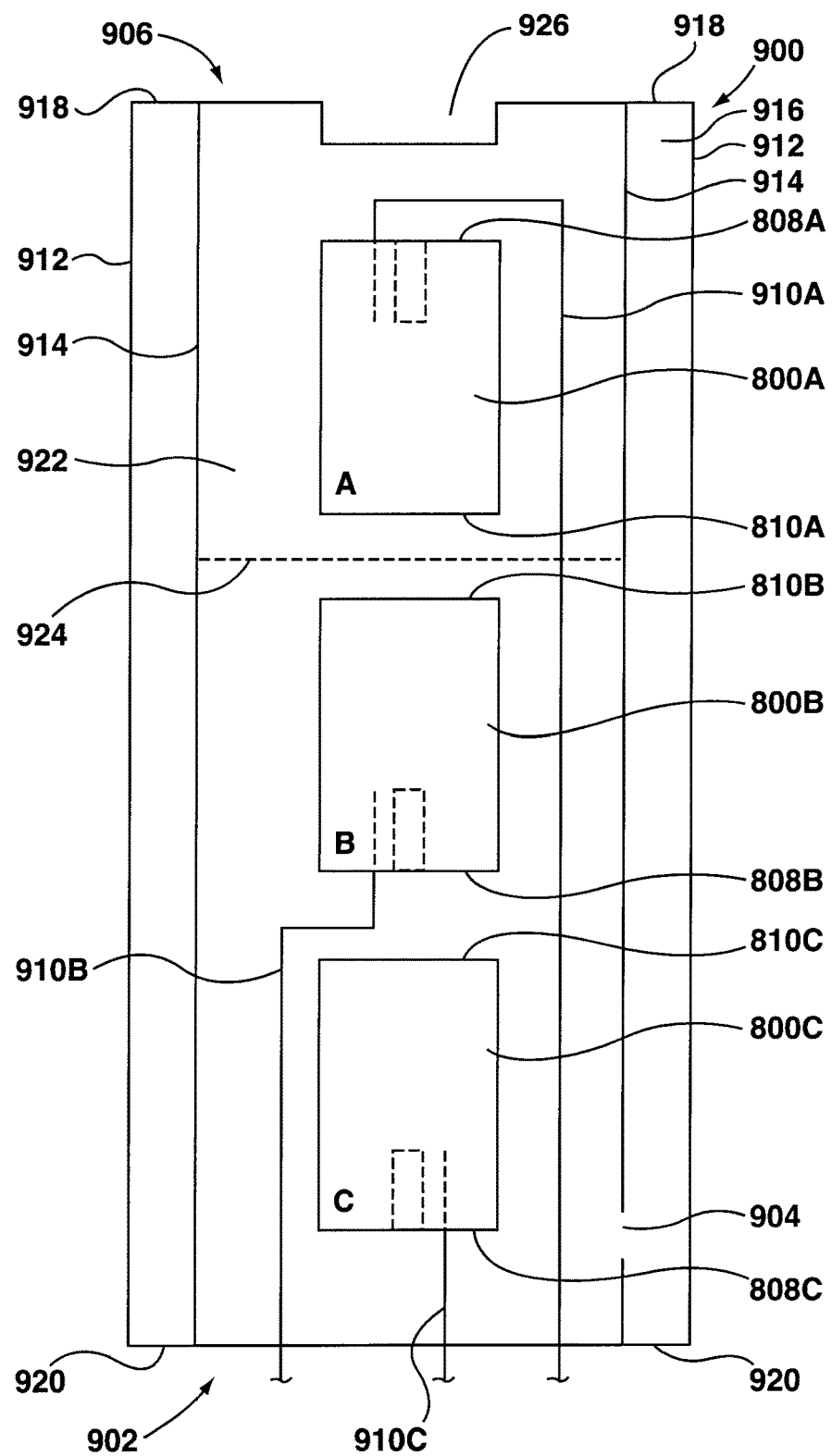
FIG. 9 is a schematic diagram of a sheath according to some embodiments of the present invention.

Referring now to FIG. 9, an arrangement of three cartridges in sheath 900 will be described. Sheath 900 comprises first sheath end 902 and second sheath end 906, and at least one outer wall 912 which extends between first end 902 and second end 906. Sheath 900 can be designed to contain one cartridge 800 or a plurality of cartridges 800. In the embodiment shown in FIG. 9, sheath 900 contains three cartridges, labeled 800A, 800B and 800C. Sheath 900, in association with the related features about to be described, can be designed to accommodate the high temperature and/or pressure that can result from the hydrogen producing reaction that occurs within cartridges 800. Outer wall 912 can comprise a material that can withstand the pressure and/or heat of the reaction, such as stainless steel. Sheath 900 can further comprise inner sheath wall 914, which can have a diameter that is smaller than the diameter of outer wall 912. Cavity 916 can be defined between inner wall 914 and outer wall 912 The inner wall and can be any suitable depth such as under or about 1 inch, for example, 0.3 inches. First end 902, second end 906, and inner wall 914 can define cavity 922, which can accommodate one or more cartridges 800, as described further below. The diameters of cartridges 800 can be designed to fit generally snugly within cavity 922, with enough room for the spray bar lines and electrical lines (described below). A generally snug fit can safely contain cartridges 800 within sheath cavity 922 and prevent excess movement of the cartridges during the hydrogen producing reactions. The skilled person would recognize that there are other means of securing cartridges 800 within cavity 922 and a snug fit may not always be required.

First end 902 can comprise rim 918, and similarly second end 906 can comprise rim 920. Rims 918 and 920 can each define an opening into cavity 922. Rims 918 and 920 can each also function to partly define cavity 916 at first end 902 and second end 906, respectively. Spray bar lines 910 A, B, and C can extend within cavity 922 from first sheath end 902 and connect with or form part of spray bar 834 (not shown) of each cartridge. The electrical connections (not shown) that provide power to heat source 811 can also extend through cavity 922 in a similar manner.

Sheath 900 can be designed to partly contain the heat released during the hydrogen producing reaction that can occur within cartridges 800. In order to contain the heat, wool or other insulating material can be disposed within cavity 916. The arrangement of cartridges 800 within sheath 900 can also impact the heat distribution within cavity 922. For example, in the embodiment shown, cartridges 800 are arranged such that the cartridges can be safely used sequentially. This can be important in certain scenarios because once a reaction is initiated, the amount of heat that is emitted from cartridge second end 810 can damage the cartridge that is adjacent to that end, particularly the adjacent cartridge's power supply for heat source 811 and spray bar lines 910. Thus, in operation, the hydrogen producing reaction in cartridge 800 B can be initiated first. In order to assist in the protection of cartridge second end 810 A, heat diverter 924 can extend between opposite sides of inner wall 914 and be secured to inner wall 914 to be generally parallel to second ends 810 B and 810 A. Heat diverter 924 can function to block the blast of heat and hydrogen emitted from second end 810 B in order to protect cartridge 800 A. Heat diverter 924 can be constructed of stainless steel, or other useful material, as can be determined by the skilled person, and should contain one or more holes that allow the passage of hydrogen but still although a diversion of heat. After the reaction is finished in cartridge 800 B, the hydrogen-producing reaction in cartridge C can be initiated. Since the reaction in cartridge 800 B is finished, that cartridge need not be protected from the heat from second end 810 C. Once the reaction of cartridge C is concluded, the hydrogen-producing reaction of cartridge 800 A can be initiated.

As hydrogen is emitted out of cartridge second ends 808 of cartridges 800 during the hydrogen-producing reaction, hydrogen can fill cavity 922. This hydrogen can pass through one or more outlets such as opening 904, which can be defined through inner wall 914, cavity 916, and outer wall 912, and collected for further use. Other hydrogen outlets of other origins and sizes can be defined in sheath 900, as would be understood by the skilled person.

Figure 10A:
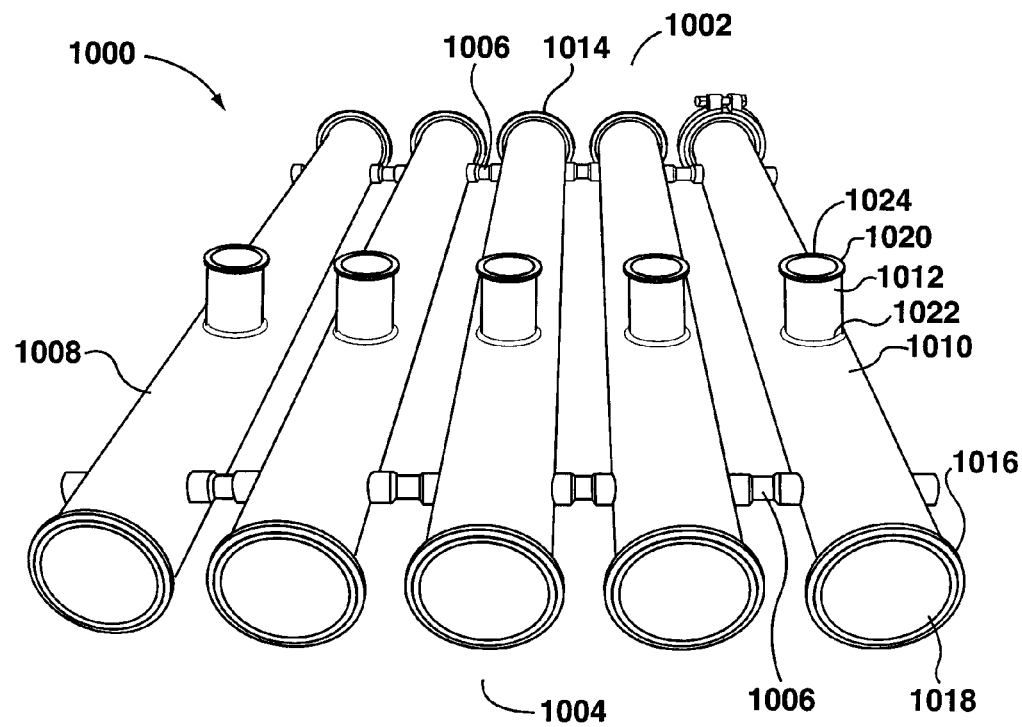
FIGS. 10A and 10B are diagrams of an assembly according to some embodiments of the present invention.
Figure 10B:
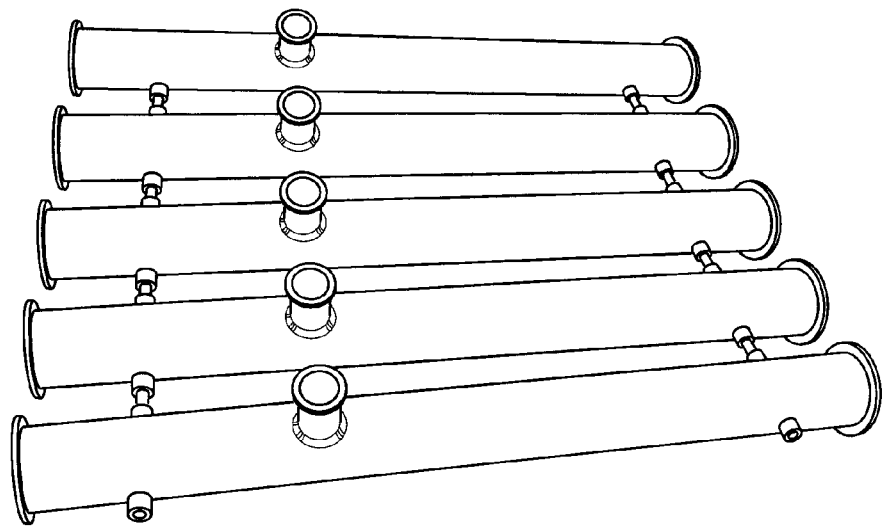

In certain applications, a plurality of sheaths 900 containing a plurality of cartridges can be assembled together in order to safely collect the hydrogen produced. Referring now to FIGS. 10A and 10B, sheath assembly 1000 is shown. Sheath assembly 1000 can comprise one or a plurality of tubes 1010 that can be arranged generally parallel to each other. Each tube 1010 can have a first end 1002 and a second end 1004. Tubes 1010 can be connected by a plurality of equalizer tubes 1006. The diameter of tubes 1010 can be about 2 inches to about 10 inches, or about 3 to about 8 inches, or about 5 to about 7 inches. The diameter of tubes 1010 can be about 4 inches. First end 1002 and second end 1004 can be connected by at least one wall 1008. Each tube 1010 can be any suitable length depending on the application and, for example, can be about 10 inches to about 60 inches long, or about 15 inches to about 50 inches long, or about 20 inches to about 45 inches long, or can be about 30 inches, about 32 inches, about 34 inches, about 36 inches, about 38 inches, about 40 inches, or about 42 inches long. First end 1002 can comprise first tube rim 1014, and similarly, second end 1004 can comprise second tube rim 1016. Both rims 1014 and 1016 define openings into cavity 1018, which can be defined within wall(s) 1008. Each tube 1010 can be designed to accommodate sheath 900 therethrough, within cavity 1018, such that sheath first end 902 does not protrude from, is flush with, or does protrude from tube first end 1002, and similarly, sheath second end 906 does not protrude from, is flush with, or does protrude from tube second end 1004. Assembly 1000 can be manufactured from gas impermeable material that can withstand temperatures of about 2200 degrees Fahrenheit and pressures of about 1500 psi, such as stainless steel. During operation, a sheath 900, loaded with cartridges 800 that have been prepared to produce hydrogen once the hydrogen-producing reaction is initiated, is placed in a tube 1010. The skilled person would understand that each tube 1010 need not be loaded with a sheath 900 in order for the assembly to be useful according to the present invention, so long as first and second ends 1002 and 1004 are sealed to prevent the escape of hydrogen.

Figure 11A:
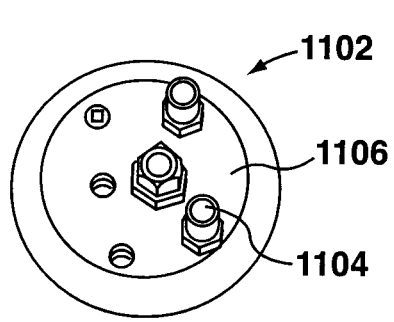
FIGS. 11A, B, and C are diagrams of end caps and clamps according to some embodiments of the present invention.
Figure 11B:
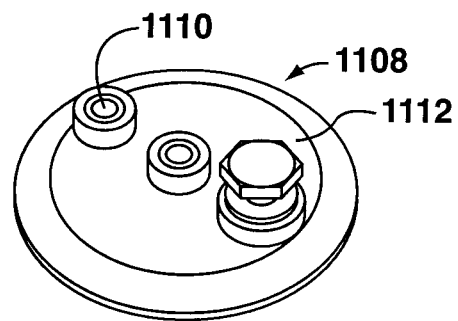
Figure 11C:
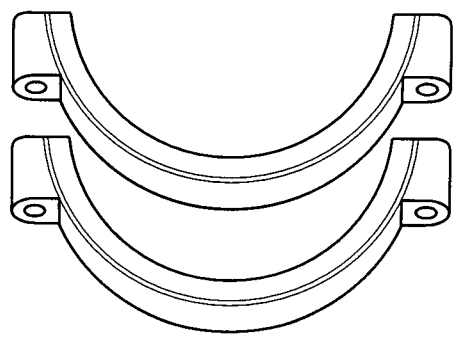

Once sheaths 900 are loaded into tubes 1010, first end 1002 can be sealed with end cap 1102 (as shown in FIG. 11B). First end cap 1102 can comprise an outer side 1106 and an inner side opposite thereto (not shown) and can be a sanitary end cap. First end cap 1102 can define a plurality of openings 1104, which can function to provide a sealed passage for various equipment required or desired to operate cartridges 800 or for managing conditions related thereto, such as equipment required to operate cartridges 800 in connection with the hydrogen-producing reaction, which can include spray bar lines and electrical connections. In order to seal first end 1002, the inner side of end cap 1102 can be sealed against first end 1002 through methods known to the skilled person. The seal can function to substantially prevent the escape of hydrogen from cavity 1018, as well as withstand any heat and pressure that results from the hydrogen-producing reaction. For example, the inner side of first end cap 1102 can be sealed against first end 1002 using sanitary clamps, an example of which are shown FIG. 11C. Similarly, second end 1004 can be sealed with end cap 1108, which comprises an outer side 1112 and an inner side. Second end cap can define a plurality of openings 1110, which can function to provide sealed passage for outlet lines which will be discussed further below. In order to prevent excessive movement of sheath 900, groove 926 can be defined in either or both ends 902 and 906. Groove 926 can coordinate with a tooth (not shown) or other protrusion protruding from a coordinating end cap in order to restrict movement of sheath 900.

Each tube 1010 can define one or more openings 1022, which can function to allow any hydrogen produced within assembly 1000 to escape in order to be used or stored. Openings 1022 can be connected to outlet tube 1012, which can be any useful shape, and can extend generally perpendicularly from tube 1010. Tube 1022 can be any diameter, such as, for example, between about 2 and about 3 inches, such as about 2$9/16$ inches, and can define cavity 1024, through which hydrogen gas and other by-products of the hydrogen-producing reaction can pass. Tube 1022 can comprise rim 1020, which can define an opening to cavity 1024. Rim 1020 can sealingly connect with another connection in order to transport the hydrogen, as will be described further below.

Figure 12:
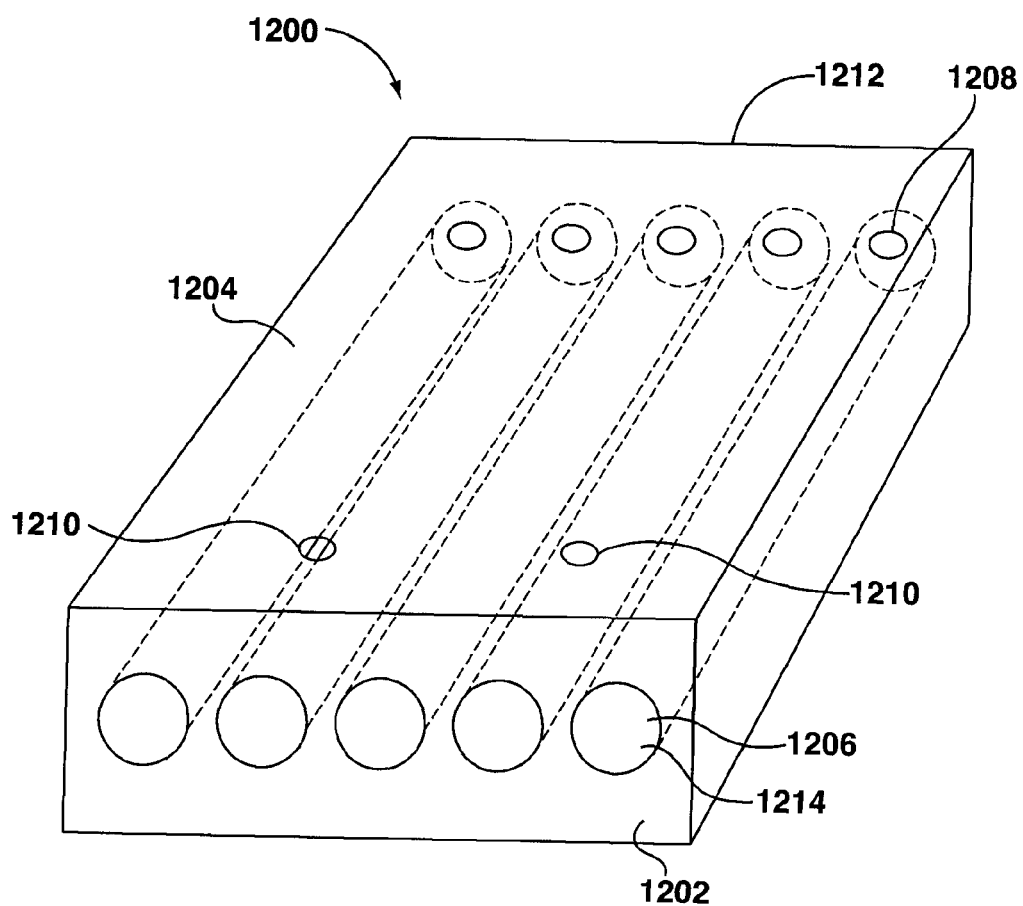
FIG. 12 is perspective drawing of a water jacket according to some embodiments of the present invention.

Assembly 1000 can be designed to allow dissipation or cooling of the heat and pressure produced from the hydrogen producing reactions. For example, equalizer tubes 1006 can connect tubes 1010 such that any heat produced in one tube 1010 can be shared with other tubes. In addition, water jacket 1200 can surround part or the majority of assembly 1000 in order to assist in cooling of the hydrogen and the equipment. Referring now to FIG. 12, water jacket 1200 can generally be a rectangular prism, although other shapes are possible, and can hold coolants other than water, such as Freon. Water jacket 1200 can comprise any suitable material, such as stainless steel, aluminum, or iron and can comprise jacket first end 1202, topside 1204, and second end 1212. First end 1202 and second end 1212 define a plurality of matching openings which lead to cavity 1214. Water jacket 1200 can be designed and fitted around assembly 1000. For example, cavity 1214 can accommodate tube 1010 in order to benefit from the cooling of water jacket 1200. The skilled person would understand that water jacket 1200 can be designed to accommodate other features of assembly 1000, including equalizing tubes 1006. On top side 1204, a plurality of openings 1208 can be defined, which extend through top side 1204 to open to cavity 1214. Openings 1208 can accommodate the passage of outlet tube 1012. Top side 1204 can further define coolant outlet openings 1210, which can connect to a coolant line for removing "spent" coolant from water jacket 1200. Fresh coolant can be added to water jacket through any opening, including openings that are not shown in FIG. 12. For example, the bottom side of water jacket 1200 can define openings for receiving fresh coolant into water jacket 1200. In some embodiments, end caps 1102 and 1108 can be sealingly connected to first and second ends 1202 and 1212 instead of directly to the ends of tubes 1010. The dimensions of water jacket 1200 can readily be determined by the skilled person and can be determined by the application. For example, the dimensions can be about 30 inches by about 40 inches by about 6 inches, which can be suitable to fit within a small car. Water jacket 1200, together with sheaths 900 filled with a plurality of cartridges 800 charged with mixture and ready to produce hydrogen once heat and water are added, and end caps 1102 and 1108, can collectively be referred to as a hydrogen production system of the present invention. It will be understood by the skilled person that all of the aforementioned components will be necessary to produce hydrogen in accordance with the present invention, depending on the application and end use of the hydrogen.

Figure 13:
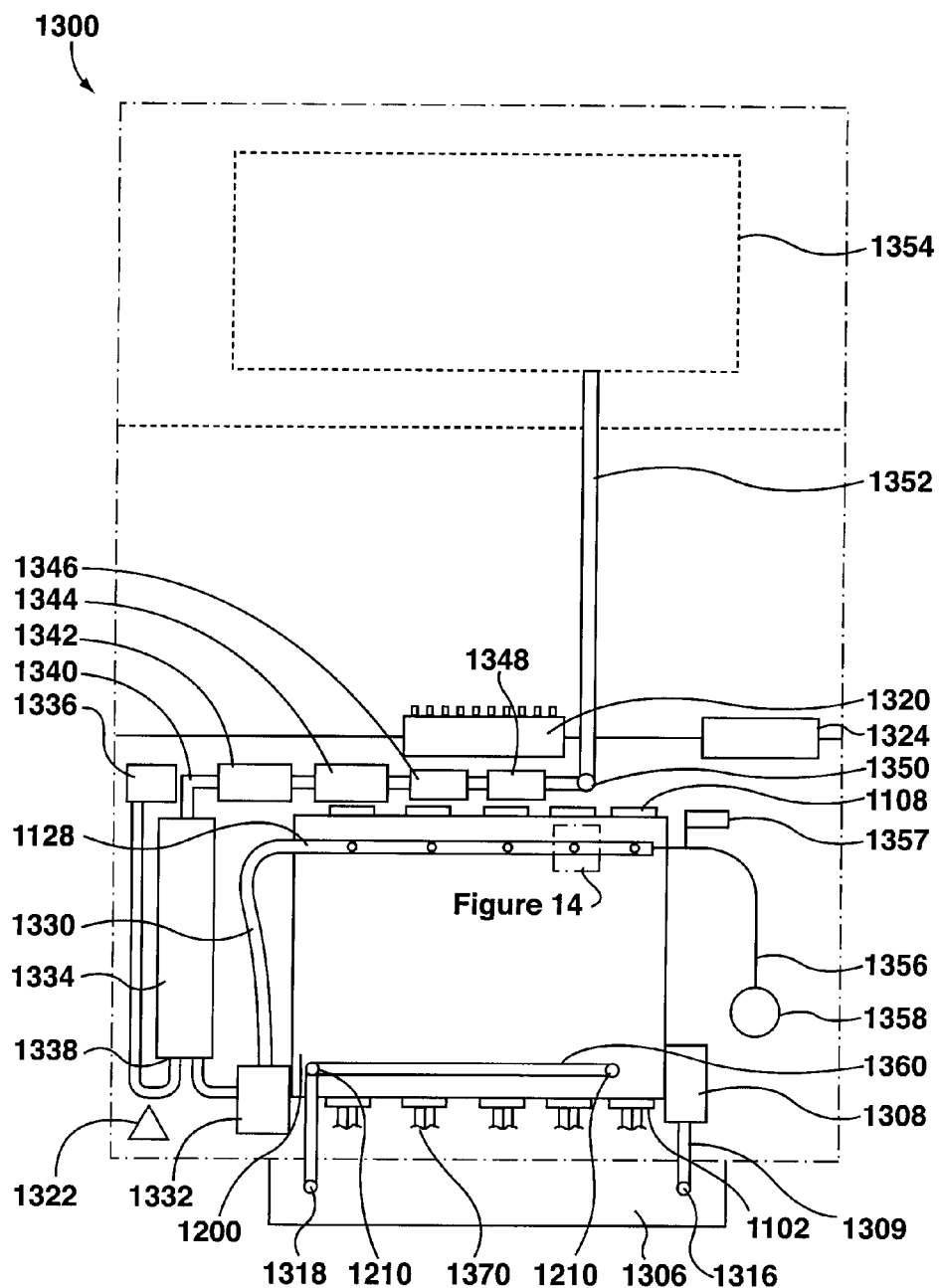
FIG. 13 is a top view drawing of a hydrogen-production system and a hydrogen purification system for in a vehicle that can use hydrogen for fuel, according to some embodiments of the present invention.

Referring now to FIG. 13, an embodiment in which a hydrogen production system of the present invention is used with a vehicle 1300 that is adapted to be fuelled by on-demand hydrogen will now be described. A hydrogen-production system of the present invention is shown situated in the back end of a car, such that first end caps 1102 are accessible from the rear of the car. The hydrogen production system can be tilted downward by about 10 to 25 degrees (or less or more) toward the center of the car, for example, in order to facilitate any drainage of liquids from the system. Spray bar lines 910 are shown extending out of first end 1102 are supplied with water via water lines (not shown) connected to a pump (not shown). The water can be replenished by a user according to known methods. One or both of openings 1210 can be connected to radiator 1306, which can be fastened around the rear of vehicle 1300 through methods known in the art. For example, radiator 1306 can define coolant radiator inlet 1318, which can be connected to openings 1210 via coolant outlet line 1360. Radiator 1306 receives "spent" coolant, which can be water or other known coolants, via outlet line 1360. Radiator 1306 can further define coolant radiator outlet opening 1316, which can be connected to coolant pump 1308 via pump line 1309. Coolant pump 1308 can be connected to inlet openings (not shown) defined in water jacket 1200 via coolant inlet lines (not shown), as could be determined by the skilled person. For example, coolant pump 1308 can pump coolant through the coolant inlet lines that connect to water jacket 1200 through openings defined on the bottom of water jacket 1200. The coolant pumped through this system can function to cool the hydrogen produced in and released from cartridges 800.

Figure 14:
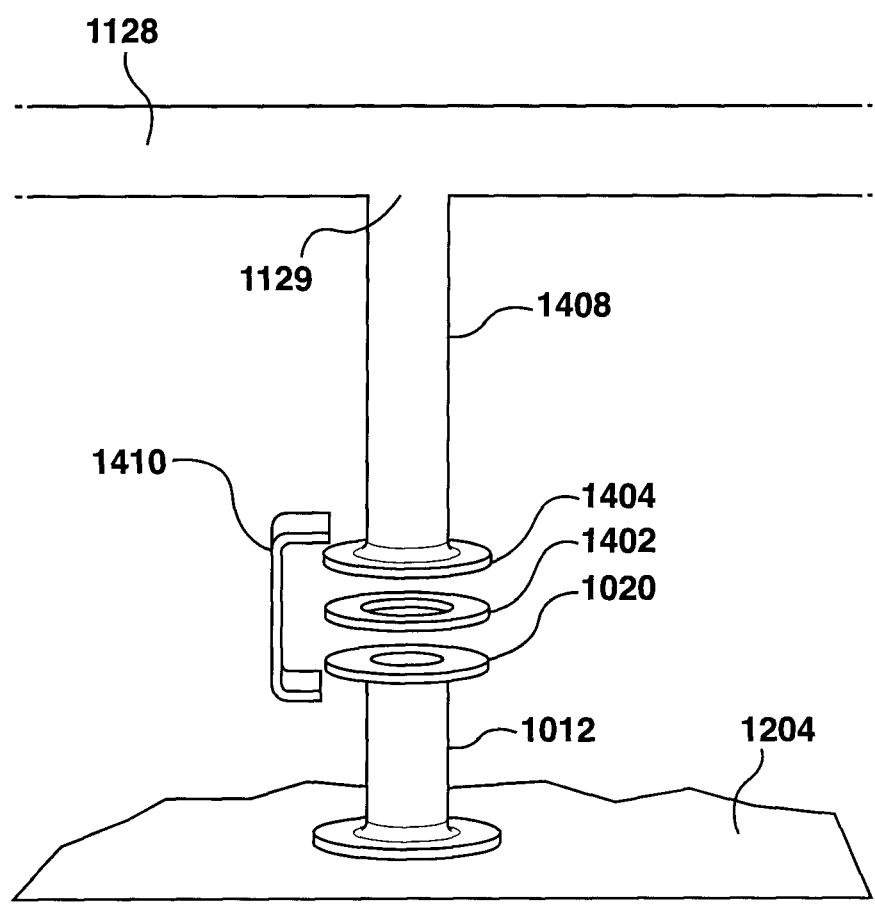
FIG. 14 is an exploded view of a connection system referred to in FIG. 13.

When hydrogen is produced, pressure rises within assembly 1000 and hydrogen is emitted via the plurality of outlet tubes 1012. In order to capture the hydrogen rail 1128 is connect to outlet tubes 1012. Referring now to FIG. 14, hydrogen rail 1128 defines a plurality of openings 1129 (only one is shown in FIG. 14). Generally, there are as many openings 1129 along hydrogen rail 1128 as there are outlet tubes 1012. Each opening 1129 sealingly connects to tubing 1408, which can comprise a flexible stainless steel, such as SB3 convoluted stainless steel hose from http://www.flexi-craft.com. Tubing 1408 can be of an suitable diameter, such as about 1.5 inches and can end with rim 1404, which can form a secure, gas impermeable connection with rim 1020 through means known in the art. In the embodiment shown, gasket 1402 can be secured between rims 1020 and 1404, which rims may each define corresponding grooves to accommodate gasket 1402. Clamp 1410, which can be a sanitary clamp, can be used to secure rims 1404 and 1020, with gasket 1402 therebetween, to form a gas impermeable seal. Hydrogen emitted from outlet tube 1012 can be very hot, and can be in the range of about 650 to about 750 degrees Fahrenheit. Therefore, the seal formed between rims 1020 and 1404 can remain gas impermeable even under thermal stress. The skilled person would appreciate that tubing 1408 need not be flexible; however, the inventor has found that having flexibility in tubing 1408 assists in maintain the seal between rims 1020 and 1404, since any movement of the system will be absorbed by the flexible tubing and need not add stress to the seal.

In the embodiment shown, as hydrogen enters hydrogen rail 1128, it will pass into tubing 1330, which is sealingly connected to one end of 1228, and then on to the cooling, drying, and purifying system, as will be describe below. At this point, one of many safety can be utilized. In the embodiment shown, safety vent line 1356 is connected to an end of rail 1128 in order to receive a sample of the hydrogen and related pressure contained therein. Vent line 1356 can be connected to at least one pressure transducer 1357. More than one pressure transducer 1357 can be used in order to ensure that a pressure reading is obtained. Rupture disk 1358 can be located downstream from pressure transducer 1357 along vent line 1356. In a situation where the pressure reading obtained by pressure transducer 1357 surpasses a predetermined level, such as about 180 psi or 200 psi, rupture disk will rupture and release the pressure of the system.

The hydrogen can pass through tubing 1330 to enter a drying, purifying and/or cooling system which comprises various components each having a substantially different function, as will now be described. It will be understood by the skilled person that all of the functions and components may not be required in certain applications, and some of the functions can be combined into one component. Further, the tubing and/or lines and or seals that connect the various components can be substantially gas impermeable and be functional at high temperatures, such as above 1200 degrees Fahrenheit.

Hydrogen passing through tubing 1330 can enter first filter station 1332, which can contain a substances that can trap particulate as well as condense moisture, such as steel wool or polyester filter fabric. The hydrogen can then pass to cooler 1334, which can be a copper heat exchanger. Cooler 1334 can receive coolant via a pump (not shown) and a coolant line (not shown) and can receive coolant from a separate heat exchanger (not shown) that utilizes coolant from an air conditioner of vehicle 1300 to cool the coolant for cooler 1334. Any water condensed in cooler 1334 can be collected at water drain 1338, which can lead to reservoir 1336 for disposal. The cooled hydrogen can exit from cooler 1334 through line 1340. At this point, the cooled gas can be at a temperature of about 38 to 42 degrees Fahrenheit. The hydrogen can then enter dryer station 1342, which can be filled with desiccant, such as silica gel or clay-based dessicant. The hydrogen can then pass through carbon filter 1344, which can substantially remove organic volatiles, odour, and particulate from the hydrogen. At this point, the hydrogen can have a purity of about 95% or higher, about 96% or higher, about 97% or higher, about 98% or higher, or about 99% or higher. The hydrogen can then pass through optional 5 micron filter 1346, which can capture any remaining fine particulate. A flow meter can be located within this system at a suitable location. For example, hydrogen can pass through flow meter 1348 after exiting filter 1346. Flow meter 1348 can determine the pressure and flow of hydrogen in the system. The pressure of hydrogen in the system can be between bout 1 to about 125 psi, or about 20 psi. The hydrogen can then pass to gas line 1352, which can be fitted generally under vehicle 1300 through opening 1350. Gas line 1352 brings the hydrogen to engine 1354, which can consume hydrogen as fuel, either as is or with modification according to known methods as described here. Engine 1354 can be a direct injection engine, a fuel injected engine, a wankel engine, or a rotary engine, or other suitable engine, as could be determined by the skilled person.

Various components of the purification system or the hydrogen-production system require power. The power can be obtained from a battery located at a suitable position of the vehicle. In vehicle 1300, power can be obtained via breaker panel 1320 via suitable cables (not shown) as can be determined and connected by the skilled person. Breaker panel 1320 can be a 12 volt (V) breaker and be located to be accessible to a user of vehicle 1300. Breaker panel 1320 can receive power from battery 1324, which can receive power from an alternator of vehicle 1300 or from the standard car battery.

Figure 15:
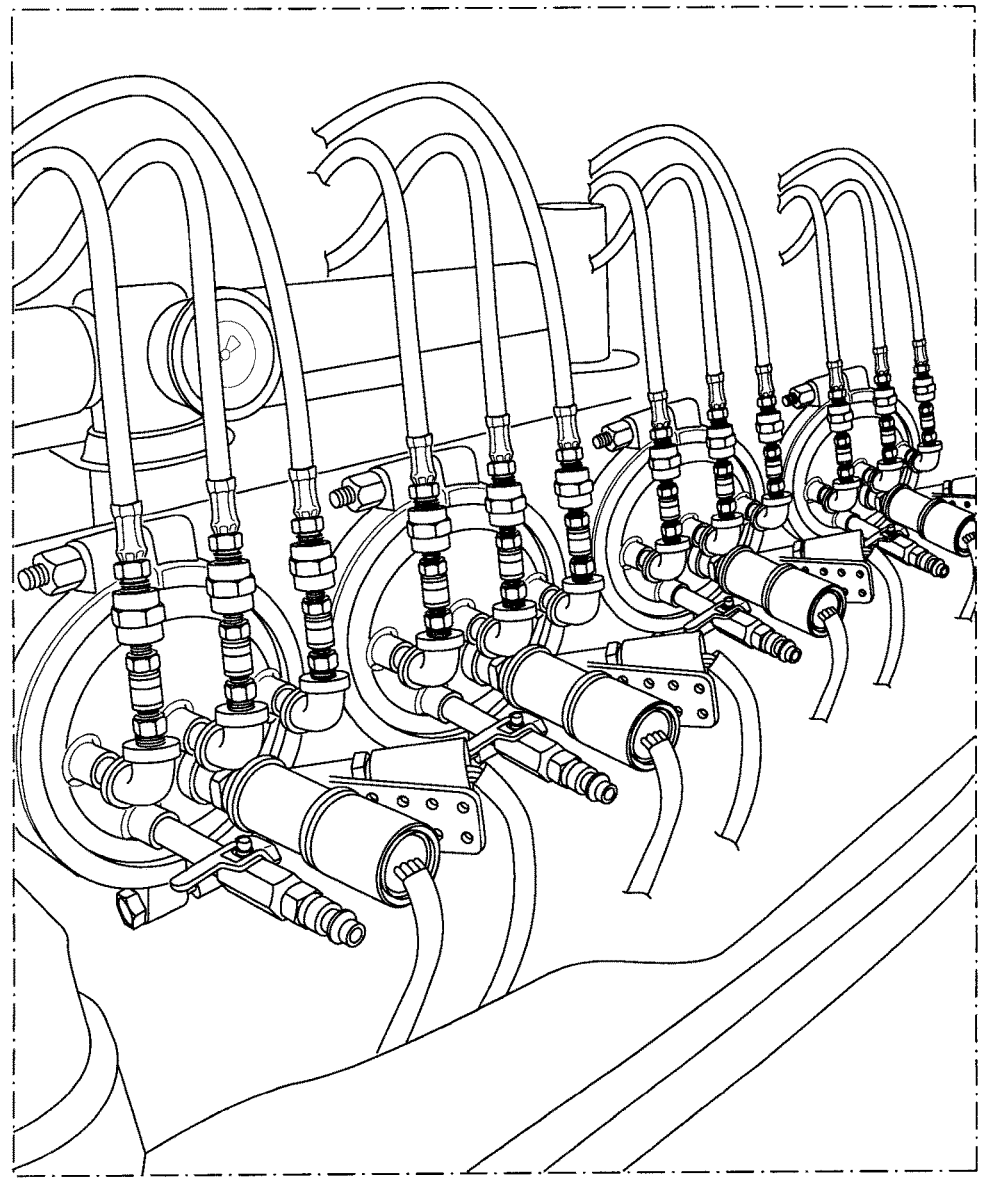
FIG. 15 is a picture of the first end of a hydrogen production system according to some embodiments of the present invention.
Figure 16:
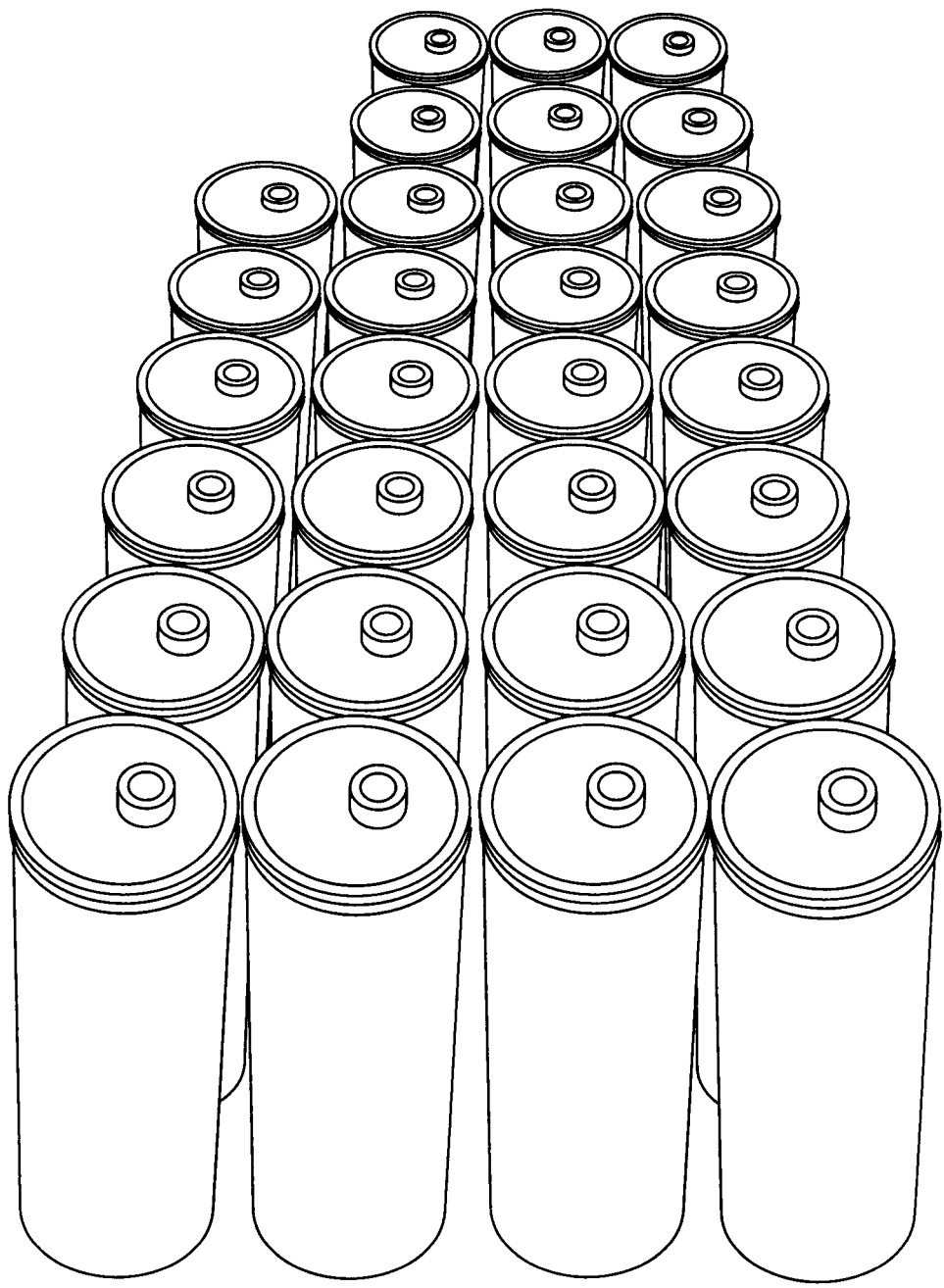
FIG. 16 is a picture of sheaths according to some embodiments of the present invention.

FIG. 15 shows a picture demonstrating the connections that can be made through the first end cap of the present invention, including spray bar lines, and power supply. FIG. 16 is a picture of a plurality of sheaths, according to some embodiments of the invention.

The systems and processes shown in FIG. 13 and described herein can be controlled by a computer, including a CPU or electronic data interchange (EDI) system. Such controlling systems can monitor the pressure and hydrogen production requirements of the system in order to engage safety features if necessary, stop hydrogen production after a cartridge is "spent", or initiate the reaction in the next cartridge by initiating the heat source and spraying a certain volume of water on the sleeve at a predetermined time. The controlling systems can also monitor the temperature of the system, and either halt the production of hydrogen and/or engage safety measures if the system becomes too hot, or engage cooling mechanisms. The controlling system can be located at any suitable location of a vehicle, such as on a passenger door. Such systems can be installed and programmed based on the description provided herein in association with the knowledge of the skilled person. There are zero or close to zero emission from the systems and methods described herein.

The hydrogen production systems of the present invention produce by-products that can be recycled using methods known to the person skilled in the art, including commercial and industrial processes. For example, oxidized aluminum that is produced as a by-product of the hydrogen-production reaction can be collected and recycled according to known methods back to aluminum metal. The oxidized aluminum by-product produced by the systems and methods of the present invention contains essentially none of the impurities or contaminants found in other aluminum sources, such as bauxite. Also, the aluminum oxides produced by in the systems described herein can be recycled again and again, as can the water and the catalyst.

Since the aluminum oxide can be recycled back to aluminum, which can be used again, there can be a continuous supply of aluminum for the reactions. Effectively, the aluminum acts as a battery that is used and then recharged. For example, recycled aluminum can be transported to various locations and used in hydrogen-production processes to produce hydrogen, which can be used to fuel an electricity-generating power plant or any and all internal combustion engines, or fuels cells. The potential to produce energy (hydrogen and heat) that can be used as a fuel to generate electricity is effectively stored in the aluminum. The hydrogen-production system and process of the present invention can produce 15 kilowatt hours (kWh) out of 1 kg of aluminum, which produces about 2 kg of aluminum oxide. It can require about 15 kWh to convert the 2 kg of aluminum oxide back into 1 kg of aluminum. In other words, using one megawatt to convert aluminum oxide to aluminum effectively stores the potential to create one megawatt later, either at the same location or a different location.

The energy required to convert aluminum oxide to one kilogram of aluminum can be approximately 15 kWh when using the Hall-Héroult process, for example. In some embodiments of the present invention, the amount of aluminum required to produce one kilogram of hydrogen through the hydrogen-production process is 8.92 kilograms. When the one kilogram of hydrogen is used as a fuel in combustion, a total of 172.5 kWh of energy can be captured (at 100% efficiency). Based on existing technology, the current efficiency achievable by an electricity power plant is sufficient to have a net positive capture of energy. However, even if the net capture of energy is negative, the process can still be financial feasible given the non-peak and peak consumption pricing structure of electricity and the relative costs of different electricity production processes, which allows our described conversion of alumina to aluminum process to take place in regions and by production process where electricity is less expensive and transport the recycled/recharged aluminum to be used in our hydrogen-production process in regions where electricity is more expensive and also to be used during peak electricity production periods, with inherent higher pricing.

The heat produced by the systems described herein can also be captured and used to produce electricity. For example, the heat can be used to produce steam in order to run a turbine. Hydrogen produced by the reactions can also be burned to heat the water in order to run the turbine.

Figure 17:
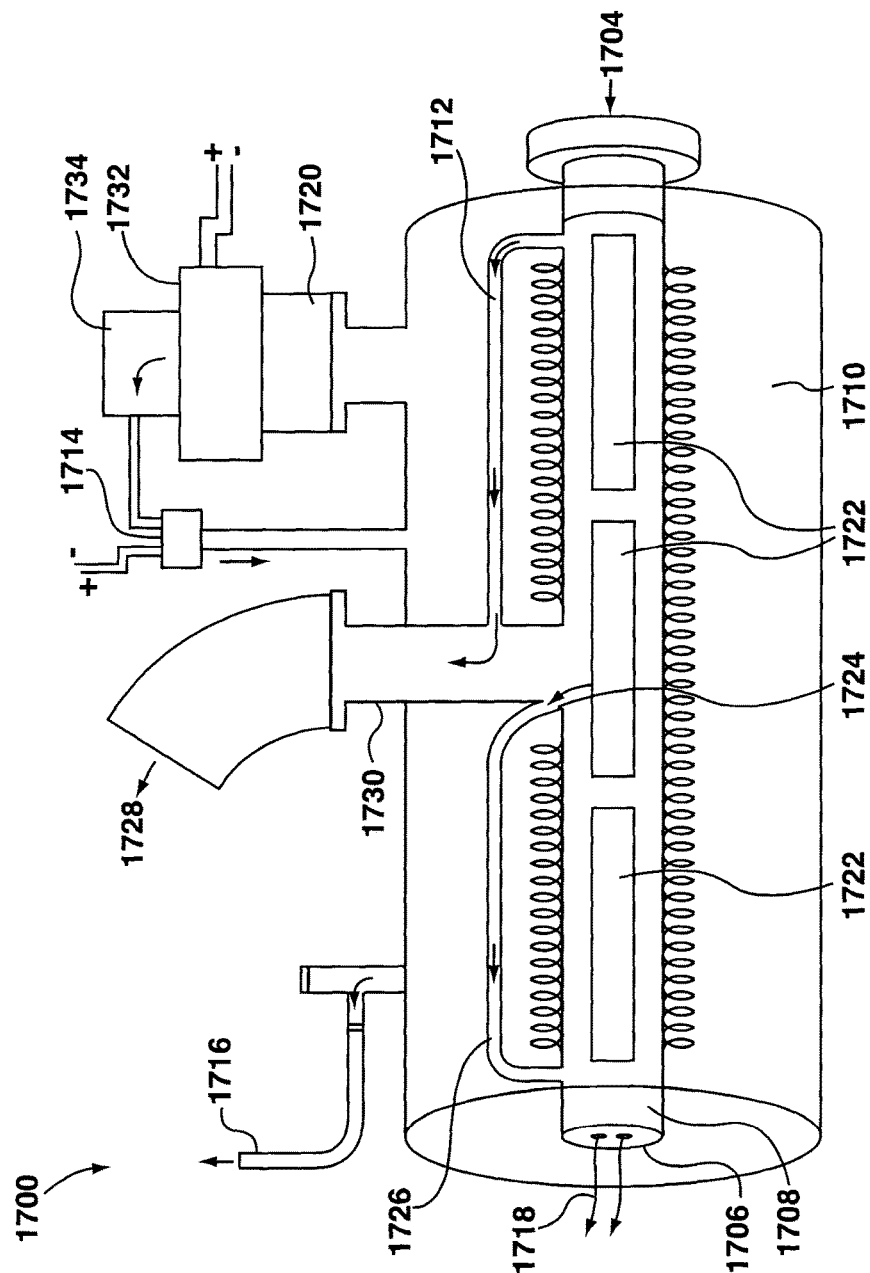
FIG. 17 is a schematic diagram of a home heating unit according to some embodiments of the present invention.

For example, the hydrogen production systems can be used to produce heat to heat a building, such as a house. Referring now to FIG. 17, home heating system 1700 is described. Home heating system 1700 consists of single or double reactor containers 1708 (application specific), end caps 1704 and 1706 to lock vessels down, drum-type water jacket 1710, a copper cooling loop inside of water jacket such that hot hydrogen is received at opening 1724 into cooling loop section 1726, which connects (not shown) to cooling loop end 1712, at which point it is cool, and emitted through hydrogen outlet 1730 to be used in a boiler, internal combustion engine, fuel cell, for direct combustion by a flame, and other uses, as would be understood by the skilled person. Home heating system 1700 also comprises water injection pump 1714, pressure blow off valve 1716, an electrical hookup 1718 for cartridge hotrods, and a steam and gas outlet 1720. Reactor container 1708 can be a minimum of 3 foot long to fit approximately 3 cartridges 1722. Cartridges 1722 can be substantially similar to cartridges 800 as described above, or can house another hydrogen production process as described herein or as known by the skilled person. Cartridges 1722 can contain aluminum powder, aluminum granules, recycled aluminum or solid aluminum bars. Cartridges 1722 can each contain 1/8" stainless steel spraybars, as described above that connect to either endcap of reactor container 1708. Hotrods (not shown) can also be within all cartridges with their electrical connections being connected to endcap as well. Copper cooling loop can be directly connected to reactor container 1708 and piped in a coil (to maximize surface area) for gas cooling through inner water jacket 1710. Safety pressure blow off valve 1716 can also be present to ensure pressures within reactor container 1708 do not exceed safe operating pressures (200-300 psi+/−). Copper coil 1712 van connect directly to hydrogen gasout (cool H2) port at top of water jacket 1710, and burned directly in a boiler, internal combustion, fuel cell, direct flame, or other application. This gas can be filtered using known methods to be used directly in a fuel cell for electricity generation, an internal combustion engine or other known/applicable hydrogen uses. Subsequently, as a reaction is taking place within cartridges 1722 and hydrogen is released, extreme heat is also released into water jacket 1710 surrounding the reactor vessel. As heat is released into bulk of water, steam will condense within water jacket and travel directly through a steam turbine system 1732 that will capture electricity instantly. Steam can be condensed at 1734 and fed back into water jacket application (application specific) through pump 1714. The skilled person would understand that the cooling system of home heating system 1700 could be modified such that the heat produced by the reaction could directly heat water for to operate the steam turbine. The skilled person would also understand that home heating unit 1700 can be changed in minor ways to replace any existing furnace, boiler setup or oil burning setup (or other application). Once spent materials (cartridges 1722) are complete, they can be removed and recharged using known methods. Cartridges 1722 can consist of aluminum powder, aluminum granules, or solid aluminum bar technology. Hydrogen gas creation and heat creation from said reaction can be directed in the following ways: (i) electrical creation for electrical heating, (ii) electrical creation to power electrical devices, (iii) direct flame/heating element creation to boil water in a radiator or radiant heating systems, (iv) direct flame creation for forced-air furnaces (furnace blower and furnace electronics can run directly off of steam turbine energy, direct flame for furnace burn off of hydrogen gas directly), (v) electrical creation to pump back into grid, or (vi) electrical creation for storage in batteries or other known electrical storage techniques.

The heat produced in the systems of the present invention can also be used to distill water in order to purify it. For example, heat from the systems of the present invention can be used to distill fresh water from salt water, such as sea water.

Un-recycled aluminum oxides can be re-used in other processes, for example as an alternative material for manufacturing of paper products, insulation of ceramics for its resistance to acids and bases at low and high temperatures, in sandpaper for its abrasiveness, grit blasting techniques, ballistic armor, and feedstock for other metallic processes (mainly pure aluminum production as mentioned above).

The hydrogen-production systems and methods of the present invention provide systems and methods for extracting hydrogen from water at low heat and with very little energy input compared to conventional means. Further, the by-product of the reaction can be a slurry that is pH neutral, environmentally friendly, and recyclable. IN addition, aluminum oxide by-products can be used as extenders and body agent in paper, solvent and water borne paints, UV curable coating, inks, polishing and cleansing agent, mold wash and adhesives. Further, as described elsewhere, the aluminum oxide or hydroxide by-products can be recycled back to aluminum metal. The cost of the system can be far lower than conventional systems used to produce hydrogen, such as electrolysis.

Figure 18:
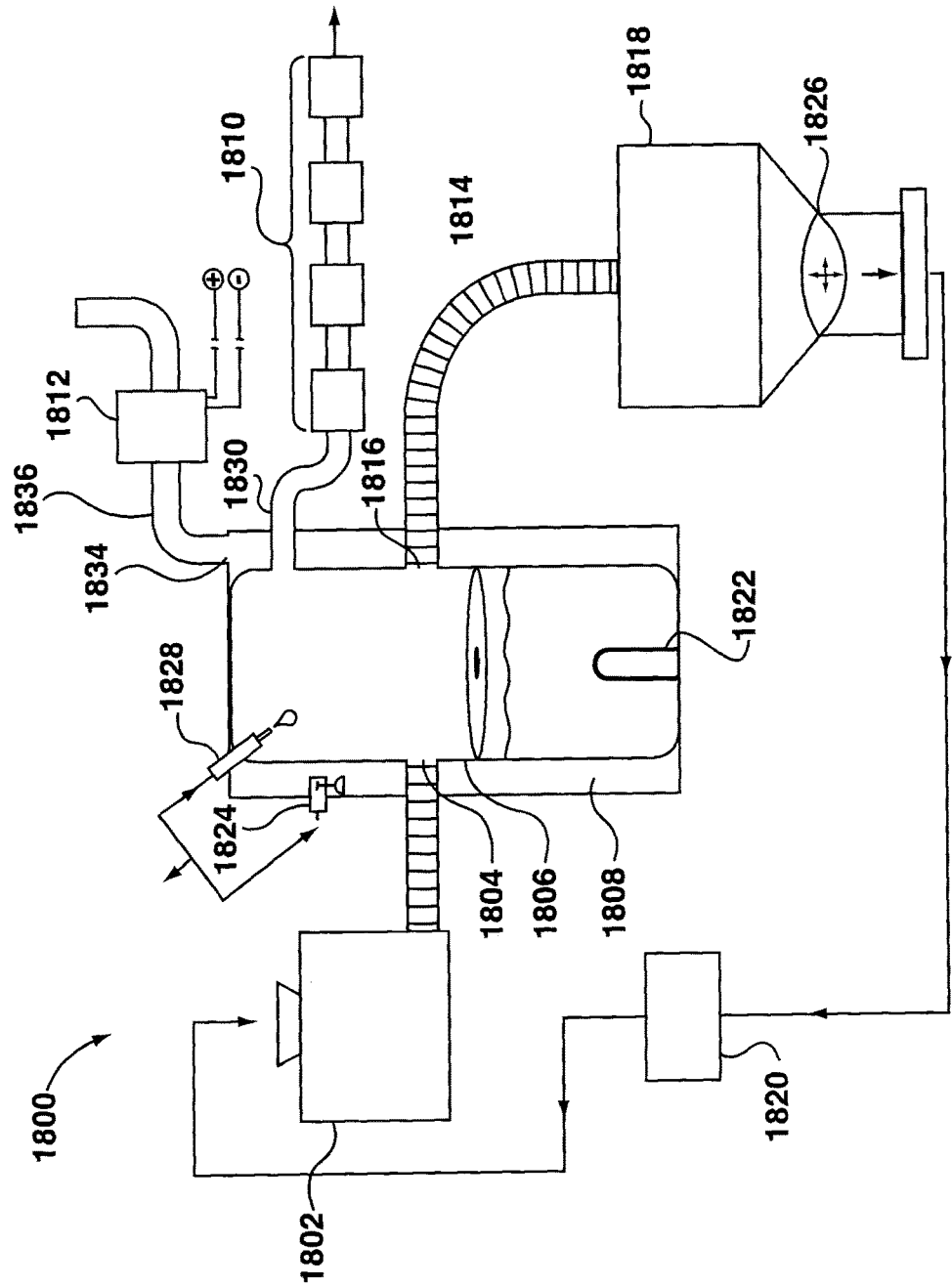
FIG. 18 is a schematic diagram of a home heating unit according to some embodiments of the present invention.

Referring now to FIG. 18, electricity-generating power plant system 1800 of the present invention is described. Power plant system 1800 can consist of raw aluminum powder, aluminum granules, recycled aluminum or solid aluminum materials, contained in hopper 1802 for its fuel on a conveyor belt system 1804, (as well as the mixture described above if required by specific application). The plant can also consist of a primary reactor pressure vessel 1806 encased in a water vessel 1808 (or multiple reactor vessels/water jacket vessel depending on the specific application). System 1800 can also comprise a gas drying/cooling filter system 1810 to release pure hydrogen, as well as steam turbine setup 1812 to capture steam from boiled water jacket 1808. The skilled person would understand that the heat produced by the hydrogen producing reaction can also be used directly to produce steam for turbine system 1812. The spent materials from the hydrogen production system can also be released from the vessel at opening 1816 as they are burned or thereafter VIA conveyor belt system 1814 to bulk holding system 1818 that captures aluminum hydroxide/oxide, grinds it to logistically friendly sizes, and which can be later recharged using the Hall-Heroult process, represented by 1820, or any other known enrichment methods. Hopper 1818 can hold aluminum powder, recycled aluminum, granular aluminum or solid bars of aluminum. A grinder at bottom of hopper 1802 can be employed to bring all aluminum fuel into granular/powder form for ease of transfer into pressurized vessel (application specific). Aluminum fuel shall pass through conveyor belt system 1804 directly into primary reactor vessel 1806. Vessel 1806 can be open to atmosphere, or closed (depending on application and volume of energy required). A level sensor 1824 and safety pressure blow off valve can also be installed to warn of water levels being too high or pressure rise too swift within reactor vessel 1806 (safety elements). A heating element 1822 on bottom of reactor vessel 1806 can initiate the hydrogen production reaction, and aluminum fuel can be fed into reactor vessel 1806 at any speed depending on the kWh's of energy that is required for specific application. Once temperature reaches a nominal point within bulk of aluminum (1200-1300 F) within vessel 1806, water cab be injected from top of reactor at injection port 1828 directly into reaction to produce hydrogen and extreme levels of heat.

The amount of aluminum present in reaction vessel 1806 vs the speed and volume of water injection is directly correlated to hydrogen and heat production rates. These rates can be infinitely adjusted depending on application and flow requirements of plant 1800. Once aluminum fuel is spent, a straining device locked on a track (not shown) can bring spent material out of slurry and towards a conveyor belt system that can then evacuate spent materials to another holding tank. Aluminum hydroxide/oxide can be grinded within hopper or holding device 1818, and materials can stay within the hopper 1818 until removed and recharged by the Hall Heroult process or other known aluminum enrichment techniques.

As the reaction takes place in reactor vessel 1806, hydrogen gas can be released instantly, and travel through the hydrogen exhaust vent 1830 at top of reactor body. The gas will then pass through purification system 1810, which can include a desiccant dryer to bring its moisture levels to a minimum. The gas can then pass through a chiller to bring gas temperature to ambient. The gas can then pass through a carbon filter to remove further impurities, then through multiple micron-sized filters (5 micron, 0.05 micron) to ensure gas production is industrially clean (for example, about 99% pure). This clean gas can be used in the following applications directly: (i) generator setup, (ii) internal combustion engines, (iii) direct flame combustion, (iv) fuel cell, (v) boiler technology to further boil water and create steam to generate electricity, (vi) gas can be compressed, stored and transported for use.

Subsequently, with the extreme release of heat from aluminum reaction within primary reactor 1806, steam can form from within the water jacket 1808 (that is containing the reactor itself). Steam can travel out of water jacket 1808 at opening 1834 and pressurize within steam exhaust lines 1836. Once steam pressure is adequate, steam turbine 1812 can open and allow for steam pressure generation to take place. This steam can then be recovered in the form of water (post-generation) and reinserted back into water jacket 1818 (again, application specific). As steam turbine 1812 runs with steam pressure, electricity generation can be instant from the turbine, and it can be used in the following ways: (i) stored in batteries, (ii) introduced directly into the grid, (iii) used to further boil or heat water, (iv) stored in another unknown electricity storage technique known to anyone seasoned in the art, (v) reinserted into the Hall-Heroult process or other like processes to re-enrich aluminum fuel, or (vi) directly put into electric vehicles. Thus, the reaction in vessel 1806 comprises raw aluminum materials (powder/granular/solid/recycled) which can be introduced into vessel 1806 (with or without the mixture describe above), water inserted causes a reaction that produces hydrogen and heat, which can provide direct heat to a turbine or can heat the water of the water jacket, producing steam that can be used in the turbine. The hydrogen produced can also be burned to heat water to operate the turbine The approximate aluminum burn at 100% efficiency is approximately 15 kWh for every 1 kg of reacted aluminum material.

The hydrogen produced by the systems and methods of the present invention can be used as a fuel on its own and does not necessarily need to be used in fuel cells to produce power. The hydrogen produced by the systems and methods of the present invention can remain in gaseous form and can be used as a fuel or stored for other uses of hydrogen. The system of the present invention can be integrated with any internal combustion engine, such as engines of various types of vehicles, such as cars, buses, boats, ships, trains, motorcycles, and the like. The systems of the present invention can also be used to fuel electricity-generating power plants and other industrial buildings and can be used in conjunction with fuel cells, generators, diesel generators, and any other device that can run on fossil fuels. The hydrogen produced can also be used to create steam by heating water.

Also falling under the scope of this invention is any vehicle or device or the like that has been integrated with a system of the present invention in order to use fully or partly hydrogen produced from the systems as a fuel. Also falling under the scope of this invention is any vehicle or device or the like that has been designed to include a system of the present invention and uses the hydrogen produced by that system.

As described herein, the systems of the present invention can be accommodated by and integrated with a vehicle, such as a car. Specifically, the systems of the present invention can be integrated with a stock engine of a vehicle. Using a car as an example, a system of the present invention can be mounted in any suitable area of the car. A natural gas conversion to vehicle can be done (regardless of engine type). Computer control of engine can be required in order to control the timing and injection of hydrogen fuel into the air intake. Injection of hydrogen fuel can be controlled by electronic injectors, which can feed back to the computer information from sensors. The sensors can read and provide information to the computer such as the status of the burn of hydrogen and overall engine performance. Adjustments can be made "on the fly" or via a laptop and operator (to debug any idle/engine bugs). Flow rates and timing can be electronically controlled and managed by an onboard computer (made by, for example, EcoFuel Vancouver).

The system of the present invention can be incorporated or used with existing fuel systems, such as gasoline or natural gas systems, and can be used either independently or as a hybrid or dual fuel or multiple-fuel system. A vehicle or device that incorporates the systems of the present invention can be switched back and forth seamlessly and "on the fly" while the engine is running between the hydrogen produced by the system of the present invention and an alternate fuel source.

The hydrogen produced by the systems and methods of the present invention can be produced "on-demand" and can be used as produced by the systems of the present invention. An "on-demand" system can be safer than using compressed hydrogen fuel solutions, as there can be little flammable or combustible fuel active at any time within the system.

Hydrogen is one of the cleanest fuels known and has no pollution index. No carbon dioxide is emitted during combustion of hydrogen. Further, the systems and methods of the present invention use some of the Earth's most abundant resources, such as aluminum and water, which does not have to be distilled and can be fresh or salt water and can contain other ions and/or components, as would be understood by the skilled person.

EXAMPLES

Example 1

Onboard Reactor (Hydrogen Producing System of the Present Invention) 2008 Ranger 2.3 L (Smaller Truck)

General Conversion Breakdown:

The test run started with a standard CNG conversion (Compressed Natural Gas conversion) as a base for the full hydrogen conversion. The entire CNG conversion concept is similar to a full hydrogen conversion concept.

Any diesel or gasoline engine can be selected to convert to a hydrogen vehicle. First, start with a vehicle that has a high compression ratio (newer engines/newer vehicles are generally more efficient). The first step was to convert this vehicle to a working CNG vehicle. This conversion can be done by a professional Natural Gas conversion shop, or by a trained conversion specialist (side note: CNG converters are pretty common in almost every country in the world, such as, for example, in Bosnia where people convert ancient wrecks and Russian vehicles to working CNG with ancient parts from the war and landfills etc).

Basic Instructions for CNG Conversion are as Follows:

Referring to FIGS. 8 and 9, a spot was found to mount a (a) 30 L iron tank in the vehicle (starter tank). This can be located anywhere in the vehicle as long as it is a safe location from obstructions, and is relatively accessible for maintenance. Once a tank was mounted, an (b) emergency shutoff valve was installed for manual control of gas flow if the need arises. Secondly, a (c) regulator was mounted close to the engine block itself. Our 2008 2.3 L ranger required a single stage regulator that drops tank pressure from 3500 PSI (in 30 L iron tank) to a useable 125-150 PSI under the hood. A regulator with a pressure relief device integrated is also recommended. Once this is properly mounted close to engine, the 30 L iron tank was connected to the regulator using (d) ¼" 304L seamless instrument grade tubing. Once completed, fuel rails were mounted under hood close to air intake. Within the fuel rail system were a set of electronic gas injectors. The inventor prefers (e) Bosch injectors for their robustness and reliability in the field. If the vehicle is a 4 cylinder, a (f) 4 cylinder fuel rail system can be purchased or created. If vehicle is 8 cylinder, an 8 cylinder fuel rail system can be purchased or created, and so on. Once the fuel rail was mounted and the electronic injectors were connected to 12V power, (g) ½" 316L tubing was connected from the regulator to the fuel rail to feed the system its fuel. (h) ECU (electronic control unit), manufactured by EcoFuel Vancouver (or any equivalent unit) was mounted close to the existing fuse panel or existing vehicles electrical harness for ease of installation. Once the ECU was mounted, fuel rail and injectors were be wired and connected to ECU to control flow/timing/pressure/efficiency of burn. Presently, piston timing can also be controlled by EcoFuel ECU (eliminates SplitSecond unit). Piston timing should be at top dead center for most efficient burn of H2 gas in cylinder. A (i) toggle switch was installed to control the ECU, which in turn controls all of the converted system. Turning off the power to the ECU brought the engine back to its stock properties (straight gasoline or diesel only). This toggle switch was located inside of the vehicle for ease of use. ECU (onboard computer) was accessed at any time VIA USB from within the cab of vehicle to change and configure timing, running efficiency, flow rate and all variables involved with smooth and reliable engine performance with this conversion system.

Hydrogen Reactor:

The hydrogen production system and all relevant peripherals was mounted somewhere close to the 30 L iron tank (preferably in trunk or bed of pickup). Once the system was connected to the 30 L iron tank of vehicle, the tank was transformed from the 'sole' hydrogen storage tank to the hydrogen buffer tank, also called the collection tank (middle ground). When the inventor's hydrogen generator was switched on and hydrogen was created in the system, it was then transported from the reactor to the buffer, subsequently being consumed by the engine. Two separate systems (conversion system and reactor) were essentially bridged (at the 30 L iron tank), and they worked unison. As the reactor generated hydrogen, it exhausted the hydrogen into the buffer, in turn being used by the engine. The buffer allowed for the reaction to 'catch up' or 'slow down' depending on driving/load conditions of engine.

Results.

The evening that this test run took place was very cold, which was thought to contribute to slow reaction times. Once an appropriate temperature was achieved, however, the reaction times were within normal limits. Therefore, this prototype can operate in any environment (i.e.: snow/ice/rainforest temperatures etc). Table 1 shows the progress of the reaction of Example 1.

The onboard reactor of this example could be removed from the vehicle and used independently to provide hydrogen to a generator to provide electricity, and could be integrated again with the vehicle engine as desired.

TABLE 1

Total Reaction Time: 25 minutes
8.9 kg of Aluminum powder (30 micron), .2 kg of CC, 12 L of H20

| Time (minutes): | Temperature of Reaction (F): | Pressure: |
|---|---|---|
| start | 65 F. | 0 PSI |
| 1 | 69 F. | 0 PSI |
| 5 | 74 F. | 0 PSI |
| 10 | 85 F. | 0 PSI |
| 12 | 90 F. | 0 PSI |
| 14 | 110 F. | 0 PSI |
| 16 | 130 F. | 3 PSI |
| 18 | 150 F. | 15 PSI |
| 20 (remove heat source) | 184 F. | 35 PSI |
| 25 (most efficient) | 188 F. | 71 PSI |
| 35 (no fuel left, burn slowing) | 182 F. | 25 PSI |

Total Fuel Used: 8.9 kg of Al+0.22 kg of CC+12 L of $H_2O$

Total H2 Produced: 1 kg of H2 (equivalent to 1 US Gallon of gasoline)

The hydrogen energy onboard produced by the system of the present invention propelled the 2.3 L Ranger (smaller truck) approx 20.3 miles (with ranging landscape (hills/dips/mountainous regions etc).

Slowest speed attained was idle, highest speed attained was approximately 120 km/per hour). Higher speeds possible and will be proven in newest concept.

1 UNIT/1 KG of Hydrogen Energy is approx equivalent to 1 US Gallon of Gasoline. Therefore, 8.9 kg of Aluminum was required to produce this 1 US Gallon equivalent (GGE) of Hydrogen. One "unit" of hydrogen energy allowed the vehicle in this experiment to travel approximately 20.3 miles. When there is 'two' units of 'hydrogen energy' onboard the vehicle (approx 19 kg of Aluminum), the energy contained within would get the vehicle approximately 40.6 miles, 'three' units of 'hydrogen energy' onboard @ 28 kg of aluminum would get the vehicle approx 61.2 miles (and so on). The amount of 'units' or 'gallons' of aluminum there are on board will determine a vehicles total driving distance. If the vehicle carries 200 kg of aluminum, it would travel approximately 440 miles.

Example 2

Converting Car

The system under the hood of Ford Focus (the hydrogen/cng injection system from ecofuel) is 80% was converted to run on hydrogen according to standard methods. The fuel rails, regulator, primary EDI, fuel rail, shut-off switch, tubing, injectors, standard wiring and high-pressure tubing was all installed in its normal compressed patent fashion.

The additional work under the hood of this Focus was as follows:

1) additional EDI in glovebox to control monitoring of OEM PCM to mimic stock settings and basically monitor and adjust the timing, pulse width and overall condition of engine fuel strategy (gasoline, hydrogen or natural gas). This information was not available from Ford, so the OEM PCM signals were mimicked to basically match them to trick the engine into thinking its running normally and burning regular gasoline.

2) high-pressure fuel rail circuit (connected to additional EDI in glovebox)

3) A ½" 0.005 micron particulate filter located just before the fuel rail to give our hydrogen generation system one last filter to ensure 0% particulate enters our engine gas stream.

The additional EDI in the glovebox controlled the simulation of the OEM PCM in several areas. The current driven injectors needed to have a satisfied current load on the OEM driver circuit to mitigate any issues pertaining to the injection circuit testing/tapping. Continuous monitoring by the stock ford OEM PCM of entire system was needed, and confirmation of accurate fuel strategy based on Injection monitor feedback was allowed.

The high pressure fuel rail controller (addition) was interfaced but simulation allowed for OEM monitors to carefully check the pressure status and confirm according to programmed look-up tables (within the stock ford OEM PCM). The dynamic control of the OEM rail pressure was also calculated to project the CNG Fuel rail pulse width in conjunction with RPM/Load strategy prescribed by the Ford OEM PCM.

The stock ford focus OEM timing schedule was modified to improve the CNG performance with minor control tweaks. The Ford Focus OEM PCM (stock) still retained all original OEM calibration and tables, and could be maintained and updated by Ford at any time (it is basically untouched, signals were simply intercepted, monitored, tweaked, and sent back to the OEM PCM in a package the stock PCM understood as a normal condition).

Thus change in this Focus system included:
addition of a high-pressure fuel rail that calculated fuel rail pulse width in parallel with focus RPM/load strategy inside of Ford Focus OEM PCM;
injectors needed to be satisfied with an electrical current load which drew its data from the injection circuit located in original ecofuel EDI (original exofuel edi under hood);
mimicking Ford Focus OEM PCM stock fuel-tables to keep errors and issues with stock ford software at a minimal;
stock Ford OEM PCM was slightly configured for high-temperature allowances in cylinder and a higher exhaust-manifold pressure and temperature
Additional modifications to Ford Focus included:
Complete removal of intake exhaust valve overlap (uploaded to vehicle currently)
Removal of exhaust gas recirculation (EGR) feature in Ford Focus to improve burn
Total removal of FlexFuel tables inside of 2012 ford focus Example 3

Standard Operating Procedure (SOP)

Before a reaction is to take place, the inventor ensured that certain criteria was taken into account for maximum performance of the reaction and overall safety of occupants and equipment. The inventor's SOP is presented here.

Firstly, ensure all sanitary fittings are tight, thermocouples and transducers are connected and tight, and all flex lines are clean, connected and tight. There should also be special care given to ensure the rupture disc and relief valves are tight and ready to operate.

The filter train assembly should also be carefully inspected before running a reaction. The ABC filter should be full of clean steel wool, the heat exchanger properly plumbed and tight, the desiccant filter shall have adequate desiccant and be snug, the carbon filter snug and supplied with clean carbon, and the particulate filter clear of any debris. The grey water tank shall also be drained and sealed up.

Install cartridge sheaths into reactor (pre-made), and secure sheath and its contents securely into sheath notch carved on front endcap of reactor. Refasten sanitary endcaps tightly. Purging the entire reactor (and lines) is essential to run the reaction in an oxygen free environment. Argon is our choice purge gas. Purging takes place from under the hood (regulator, high pressure lines and compressed gas storage tank), as well as from the rear of the reactor VIA the rear reactor end-caps (back of bumper). Pressuring these systems to a minimum of 4 bar or 60 psi and evacuating gas will eliminate possibility of oxygen contamination within our reactor and subsequent sub-systems.

Once purge is complete, pressurize entire reactor and sub-systems with approximately 5 PSI of Hydrogen. Begin an entire systems leak check with a combustible gas detector to ensure all fittings, valves, endcaps, sanitary fittings, plumbing, thermocouples, tanks and lines are secure and not leaking. Once entire systems leak check is complete, evacuate 5 PSI hydrogen into atmosphere and close reactor vent to keep atmosphere from infiltrating back up lines (valve timing is important here).

Before beginning reaction countdown, ensure radiator fans, AC pump, radiator pump, injection pump, coolant pump (chilled by AC), and safety vent valve are all powered up and running in unison without issue. Inspect all devices for electrical deformities, cracks in bodies or mounting brackets and any other safety issues that may be present in any of the equipment. Ohms check all hotrod connections from PLC, relays and rear endcap electrical connections to and from the hot rods. Ensure both battery isolation switches are turned to ON, and confirm PLC flatscreens are powered and reading their programming source properly. Confirm PLC is set to 'run' mode.

Bleed injection pump to ensure water-injection system is fully primed. Check volts on front battery and rear telecom battery. Front battery should read approx 12.6 volts, and rear battery should read 12.8 volts. Open up pressure differential valve located under filter train, as well as blue isolation valve located beside pressure differential valve. This will connect reactor and subsystems directly to 'under the hood' systems and buffer tank.

Hook up water injection lines to rear endcap of reactor (×3 injection lines per endcap). Connect hot-rod electrical connection from endcap to female adapter. Visually check over all systems.

When ready, press "start" button on touch screen. PLC program will commence, and reaction will begin.

As gas is being created the touchscreen monitor (directly from PLC) will display all the vital pieces of information (PSI/temp/thermocouple temperature, flow meter data) etc.

All fresh gas will pass through cooling and filter train and be stored in pure/dry/cold form in buffer tank and reactor body itself. Once gas creation is complete, gas can be vented to atmosphere, harvested in an auxiliary cylinder or used immediately by vehicle itself (by pressing button with the cleanwave logo located inside of vehicle cabin). Once gas is evacuated or used inside of reactor and buffer tank, entire reactor body, high pressure lines and buffer tank should be purged the whole way through using an inert gas such as Argon.

Once blow through is complete, cartridge sheaths can be removed from reactor.

Vehicle systems can now all be powered down, and front and rear battery isolation switches can be turned off. Reaction is complete, and equipment is evacuated of any lingering gasses.

Vehicle can now be stored safely.

Example 4

A Test Run of the Vehicle

Cartridges were loaded in order with the reactor endcap accessible. Water spraybars were attached to endcap and run down the side of cartridges to enter each cartridge approximately near the middle of the inner cartridge hotrod sheath. A hotrod was installed in every cartridge, and wiring was run parallel down the length of the spraybars to the endcap ceramic blocks where they were wired up. Once a cartridge assembly was complete, it was slid into a stainless steel sheath that was slid into another stainless steel sheath that was lined with thermal wool (for thermal protection of reactor body). Water spraybars were installed onto rear endcap, and hotrods were wired up to ceramic blocks on rear endcap. Once assembly of cartridges was complete, the entire sheath (one sheath=3 cartridges), was slid into the reactor tube and secured at front of reactor endcap. The reactor was then sealed, and the sanitary fittings were tightened.

The entire reactor system was then purged with Argon gas to remove any oxygen present in the system. A leak test was performed on all equipment after Argon pressure reaches 60 psi within reactor system. When leaks were determined to be 0% throughout, the Argon was bled into atmosphere VIA manual relief valve. When argonwais bled to <0 psi, manual relief valve was closed to lock system off to atmosphere.

After electrical safety checks (pumps/relief valves/breakers/overall electrical system checklist) were complete, the hotrod ceramic block was plugged into its power receiver (on outside of reactor) and water injection lines were attached to rear endcap.

When ready, the "start" icon on touch screen was hit and the initialization signaled run from the touch screen to the PLC, thus beginning the countdown. The first hot rod (cartridge B) was powered up for a total of 180 seconds, after which time water injection began on cartridge B. Just as water injection on cartridge B began, cartridge A hot rod began to heat. After an additional 180 seconds of time, cartridge A spray bar began to inject water. When cartridge A began to inject water, cartridge C began heating up. After 180 seconds of cartridge C heating up, water was injected into cartridge C.

The cartridges lit/burned and made gas in the following order: B, A, C

Below is data from a standard test run.

| Cartridge: | Total Aluminum: | Total H2 Produced: |
| --- | --- | --- |
| A | 500 g + 10 g material X | 492 L of Hydrogen |
| B | 500 g + 10 g material X | 498 L of Hydrogen |
| C | 500 g + 10 g material X | 494 L of Hydrogen |

Efficiencies were in the mid 90's, and higher levels of hydrogen gas are expected to be produced when the total aluminum used is increased.

Once this hydrogen gas was created onboard our vehicle reactor, it was cooled and chilled by the heat exchanger and brought down to very cool working temperatures to be used in vehicle immediately.

With these prototype cartridges and increased densities, our vehicle can travel upwards of 3.5 miles PER cartridge.

While the invention has been described and illustrated in connection with preferred embodiments, many variations and modifications, as will be evident to those skilled in the relevant arts, may be made without departing from the spirit and scope of the invention; and the invention is thus not to be limited to the precise details of methodology or construction set forth above as such variations and modifications are intended to be included within the scope of the invention. Except to the extent necessary or inherent in the processes themselves, no particular order to steps or stages of methods or processes described in this disclosure, including the Figures is implied. In many cases the order of process steps may be varied without changing the purpose, effect, or import of the methods described.

The invention claimed is:

1. A hydrogen production system for producing hydrogen on-demand or for storage, wherein the hydrogen is produced from water, said system comprising:
a vessel for holding a mixture, said mixture comprising a homogeneous blend of aluminum and a wool medium,
an electrically powered heat source for exposing the mixture to heat, said electrically powered heat source disposed within the vessel,
a water source disposed within the vessel including a nozzle disposed within the vessel and positioned to eject water onto the electrically powered heat source,
an outlet for the hydrogen produced by a reaction between the water and the aluminum,
an outlet fluid line coupled to the outlet and through which the hydrogen produced by the reaction passes from the vessel,
a temperature probe disposed at least partially in the vessel in thermal proximity to the mixture, the temperature probe configured to detect a temperature of the mixture,
a flow meter in fluid communication with the outlet fluid line, the flow meter configured to measure and control a flow rate of the hydrogen produced by the reaction between the water and the aluminum through the outlet fluid line,
a pressure transducer in fluid communication with the outlet via the outlet fluid line, the pressure transducer configured to measure a pressure of the hydrogen produced by the reaction between the water and the aluminum through the outlet fluid line, and
at least one controller operatively connected to the temperature probe, the electrically powered heat source, the flow meter and the pressure transducer, the at least one controller configured to monitor the detected temperature, the measured flow rate and the measured pressure, wherein the at least one controller is configured to adjust one or more of the temperature, the flow rate and the pressure based on at least one of the detected temperature, the measured flow rate and the measured pressure, and wherein the homogeneous mixture of aluminum and wool medium is packed into and fills in a volume within the vessel containing the electrically powered heat source and the water source and the nozzle.

2. The system according to claim 1, wherein the aluminum comprises aluminum powder, aluminum granules, aluminum milled balls, aluminum shavings, one or more solid aluminum bars, or mixtures thereof.

3. The system according to claim 1, where the aluminum comprises recycled aluminum.

4. The system according to claim 1, wherein the wool medium is synthetic, or an alkaline earth silicate wool product, or kaowool.

5. The system according to claim 1 further comprising at least one of: a collection vessel connected to the outlet and a vehicle or generator that consumes the hydrogen connected to the outlet.

6. The system according to claim 1, further comprising components for purifying, cooling, drying or compressing the hydrogen.

7. The system according to claim 1, further comprising a catalyst for producing hydrogen.

8. The system according to claim 1, wherein the hydrogen production system produces heat energy upon producing hydrogen.

9. The system according to claim 1, wherein the heat energy heats water to operate a turbine.

10. The system according to claim 1 further comprising:
a tank for supplying the mixture to the vessel, and
a pump, in fluid communication with the tank, configured to inject the mixture from the tank into the vessel and to continue to inject the mixture from the tank into the vessel as the reaction between the water and the aluminum proceeds.

11. The system according to claim 10, wherein the pump is further configured to inject the mixture into the vessel as pressure builds during the reaction between the water and the aluminum.

12. The system according to claim 10, wherein the pump is electrically powered.

13. A method of using a hydrogen production system for producing hydrogen on-demand or for storage, wherein the hydrogen is produced from water, said system comprising a vessel for holding a mixture, said mixture comprising a homogenous blend of aluminum and a wool medium, an electrically powered heat source for exposing the mixture to heat, the electrically powered heat source disposed within the vessel, a water source disposed within the vessel, said water source including a nozzle disposed within the vessel and positioned to eject water onto the electrically powered heat source, and an outlet for the hydrogen produced by a reaction between the water and the aluminum, an outlet fluid line coupled to the outlet and through which the hydrogen produced by the reaction passes from the vessel, a temperature probe disposed at least partially in the vessel in thermal proximity to the mixture, the temperature probe configured to detect a temperature of the mixture, a flow meter in fluid communication with the outlet fluid line, the flow meter configured to measure and control a flow rate of the hydrogen produced by the reaction between the water and the aluminum through the outlet fluid line, a pressure transducer in fluid communication with the outlet via the outlet fluid line, the pressure transducer configured to measure a pressure of the hydrogen produced by the reaction between the water and the aluminum through the outlet fluid line, and at least one controller operatively connected to the temperature probe, the electrically powered heat source, the flow meter and the pressure transducer, the at least one controller configured to monitor the detected temperature, the measured flow rate and the measured pressure, wherein the at least one controller is configured to adjust one or more of the temperature, the flow rate and the pressure based on at least one of the detected temperature, the measured flow rate and the measured pressure, comprising the steps of packing the mixture into the vessel such that the mixture fills in a volume within the vessel containing the electrically powered heat source and the water source and nozzle and can receive heat from the electrically powered heat source, activating the electrically powered heat source until the electrically powered heat source reaches a predetermined temperature, via the water source, introducing water to the vessel and directing the water via the nozzle onto the electrically powered heat source disposed within the vessel, allowing the reaction to proceed until a desired amount of hydrogen is obtained, producing an oxidized aluminum product as the hydrogen production proceeds, and retrieving the oxidized aluminum product.

14. The method of using a hydrogen production system for producing hydrogen on-demand or for storage of claim 13, wherein the method further comprises releasing heat during the reaction, and using at least one of the produced hydrogen or released heat to: heat a building, operate a water heater, operate a turbine, operate a water desalination plant or operate an electrical generator.

15. The method of using a hydrogen production system for producing hydrogen on-demand or for storage of claim 13, wherein the hydrogen production system includes a tank for supplying the mixture to the vessel, and a pump in fluid communication with the tank configured to inject the mixture from the tank into the vessel and to continue to inject the mixture from the tank into the vessel as the reaction between the water and the aluminum proceeds, and further comprising the step of producing hydrogen at a flow rate of at least 180 LPM (Liters Per Minute).

* * * * *